(12) United States Patent
Nagaoka et al.

(10) Patent No.: US 9,664,952 B2
(45) Date of Patent: May 30, 2017

(54) MOISTURE-PROOF STRUCTURE AND DISPLAY DEVICE

(71) Applicant: Sony Corporation, Tokyo (JP)

(72) Inventors: Kenichi Nagaoka, Tokyo (JP); Noboru Murabayashi, Saitama (JP); Yoshinari Shirata, Chiba (JP)

(73) Assignee: Saturn Licensing LLC, New York, NY (US)

( * ) Notice: Subject to any disclaimer, the term of this patent is extended or adjusted under 35 U.S.C. 154(b) by 167 days.

(21) Appl. No.: 14/101,592

(22) Filed: Dec. 10, 2013

(65) Prior Publication Data

US 2014/0168916 A1 Jun. 19, 2014

(30) Foreign Application Priority Data

Dec. 19, 2012 (JP) .................................. 2012-276852

(51) Int. Cl.
*G02F 1/1339* (2006.01)

(52) U.S. Cl.
CPC .. *G02F 1/1339* (2013.01); *G02F 2001/13398* (2013.01); *G02F 2201/50* (2013.01)

(58) Field of Classification Search
CPC ............... G02F 2201/50; G02F 1/1341; G02F 2001/13398
USPC ................... 349/153–158, 190, 98
See application file for complete search history.

(56) References Cited

U.S. PATENT DOCUMENTS

| | | | | |
|---|---|---|---|---|
| 5,610,742 A * | 3/1997 | Hinata | .................. | G02F 1/1333 349/122 |
| 6,204,906 B1 * | 3/2001 | Tannas, Jr. | ............ | G02F 1/1339 349/153 |
| 6,704,072 B2 * | 3/2004 | Jeong | .................... | G02F 1/1339 345/82 |
| 2002/0149730 A1 * | 10/2002 | Jeong | .................... | G02F 1/1339 349/153 |
| 2002/0196396 A1 * | 12/2002 | Sakamoto | ......... | G02F 1/133553 349/113 |
| 2003/0137630 A1 * | 7/2003 | Niiya | .................... | G02F 1/1339 349/153 |

(Continued)

FOREIGN PATENT DOCUMENTS

JP 2009-080396 A 4/2009

OTHER PUBLICATIONS

Taiwanese Office Action for Application No. 102145578 dated Jan. 10, 2017.

(Continued)

*Primary Examiner* — Paul Lee
*Assistant Examiner* — Jia Pan
(74) *Attorney, Agent, or Firm* — Lerner, David, Littenberg, Krumholz & Mentlik, LLP

(57) ABSTRACT

A moisture-proof structure includes: a sealing layer surrounding or covering a moisture-proof target between a first base material and a second base material; a moisture-proof material provided in contact with an outer side of the sealing layer and in a peripheral section of the first base material and the second base material, in which the peripheral section is located outside the sealing layer; and an uneven structure provided in a part of the first base material that makes contact with the moisture-proof material and in a part of the second base material that makes contact with the moisture-proof material.

17 Claims, 23 Drawing Sheets

(56) References Cited

U.S. PATENT DOCUMENTS

| | | | | |
|---|---|---|---|---|
| 2007/0053063 | A1* | 3/2007 | Adachi | G02B 1/111 |
| | | | | 359/582 |
| 2007/0291216 | A1* | 12/2007 | Chan | G02F 1/1339 |
| | | | | 349/153 |
| 2009/0161048 | A1* | 6/2009 | Satake | G02F 1/133305 |
| | | | | 349/110 |
| 2009/0237775 | A1* | 9/2009 | Ito | G02F 1/1339 |
| | | | | 359/296 |
| 2009/0290113 | A1* | 11/2009 | Nakahata | B32B 38/1866 |
| | | | | 349/138 |
| 2012/0249916 | A1* | 10/2012 | Nagano | G02F 1/1345 |
| | | | | 349/46 |
| 2013/0265536 | A1* | 10/2013 | Hashimoto | G02C 7/083 |
| | | | | 349/153 |

OTHER PUBLICATIONS

Taiwanese Search Report for Application No. 102145578 dated Jan. 10, 2017.

* cited by examiner

MOISTURE-PROOF STRUCTURE AND DISPLAY DEVICE

CROSS REFERENCE TO RELATED APPLICATIONS

This application claims the benefit of Japanese Priority Patent Application JP2012-276852 filed on Dec. 19, 2012, the entire contents of which are incorporated herein by reference.

BACKGROUND

The present disclosure relates to a moisture-proof structure suitable for display devices such as television devices, and to a display device equipped with this moisture-proof structure.

Flat panel display devices with, for example, a liquid crystal display (LCD) or an organic electroluminescence (EL) display include two glass substrates and a sealing layer disposed therebetween. This sealing layer has a function of bonding the glass substrates together and sealing a display element in an inner area therebetween. For example, Japanese Unexamined Patent Application Publication No. 2009-80396 proposes that a moisture-proof section exhibiting a water-shedding property is provided on the outer side of the sealing layer. This moisture-proof section contains a filler made of a surface-hydrophilic matter.

SUMMARY

The display devices described above are requested such that moisture is suppressed from entering the sealing layer, in order to prevent the sealing layer from exhibiting the deteriorated sealing property.

It is desirable to provide a moisture-proof structure that is capable of suppressing moisture from entering a sealing layer, and a display device equipped with this moisture-proof structure.

A moisture-proof structure according to an embodiment of the present disclosure includes: a sealing layer surrounding or covering a moisture-proof target between a first base material and a second base material; a moisture-proof material provided in contact with an outer side of the sealing layer and in a peripheral section of the first base material and the second base material, in which the peripheral section is located outside the sealing layer; and an uneven structure provided in a part of the first base material that makes contact with the moisture-proof material and in a part of the second base material that makes contact with the moisture-proof material.

A display device according to an embodiment of the present disclosure is provided with a display element and a moisture-proof structure. The display element is provided between a first base material and a second base material, and the moisture-proof structure sets the display element as a moisture-proof target. The moisture-proof structure includes: a sealing layer surrounding or covering the display element between the first base material and the second base material; a moisture-proof material provided in contact with an outer side of the sealing layer and in a peripheral section of the first base material and the second base material, in which the peripheral section is located outside the sealing layer; and an uneven structure provided in a part of the first base material that makes contact with the moisture-proof material and in a part of the second base material that makes contact with the moisture-proof material.

In the moisture-proof structure and the display device according to the above-described embodiments of the present disclosure, the uneven structure is provided in the respective parts of the first base material and the second base material that make contact with the moisture-proof material. Providing a step shape as the uneven structure increases a resistance between the first base material and the moisture-proof material or between the second base material and the moisture-proof material, thereby enhancing the adhesion therebetween. This suppresses moisture from entering the sealing layer. If moisture attempts to enter the sealing layer, it reaches the uneven structure before reaching the sealing layer. Then, the moisture is blocked by the uneven structure, because moisture has difficulty moving beyond the step. Therefore, the moisture is less likely to further move toward the sealing layer. Thus, the moisture is suppressed from entering the sealing layer.

According to the moisture-proof structure and the display device of the above-described embodiments of the present disclosure, the uneven structure is provided in the part of the first base material that makes contact with the moisture-proof material and in the part of the second base material that makes contact with the moisture-proof material. Therefore, it is possible to suppress moisture from entering the sealing layer.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure will be described in detail, with reference to the accompanying drawings. The description will be given in the following order.

1. First embodiment (a curved type of liquid crystal display device: an example in which uneven structures are each configured with a pattern of a metal or resin layer)
2. Modification 1-1 (an example in which the uneven structures are provided in respective parts of the first and second base materials which make contact with a moisture-proof material)
3. Modification 1-2 (an example in which a black layer is provided between a transparent substrate and a sealing layer and in a region defined inwardly of the sealing layer)
4. Second embodiment (an example in which the uneven structures are each formed by processing the transparent substrate)
5. Modification 2-1 (an example in which the black layer is provided up to an end of the transparent substrate)
6. Third embodiment (an example in which the uneven structures are each configured with grooves formed in the transparent substrate)
7. Fourth embodiment (an example in which presser members are provided on outer surfaces of a peripheral section).
8. Modification 4-1 (an example in which each presser member has three rectangular sides)
9. Fifth embodiment (an example in which the uneven structures are each configured with surface roughness of the transparent substrate)
10. Sixth embodiment (an example in which an optical member is bonded to an outer surface of a second base material through a bonding layer, and an upper moisture-proof material is provided in contact with an outer surface of the bonding layer)
11. Seventh embodiment (an example in which a moisture-proof material is provided only in each corner of the peripheral section)
12. Eighth embodiment (an example of an organic EL display device)
13. Ninth embodiment (an example of a flat type)
14. Modification 9-1 (an example in which a front exterior member is removed and a glass plate is used as an entire front surface)

[First Embodiment]

Figure 1:
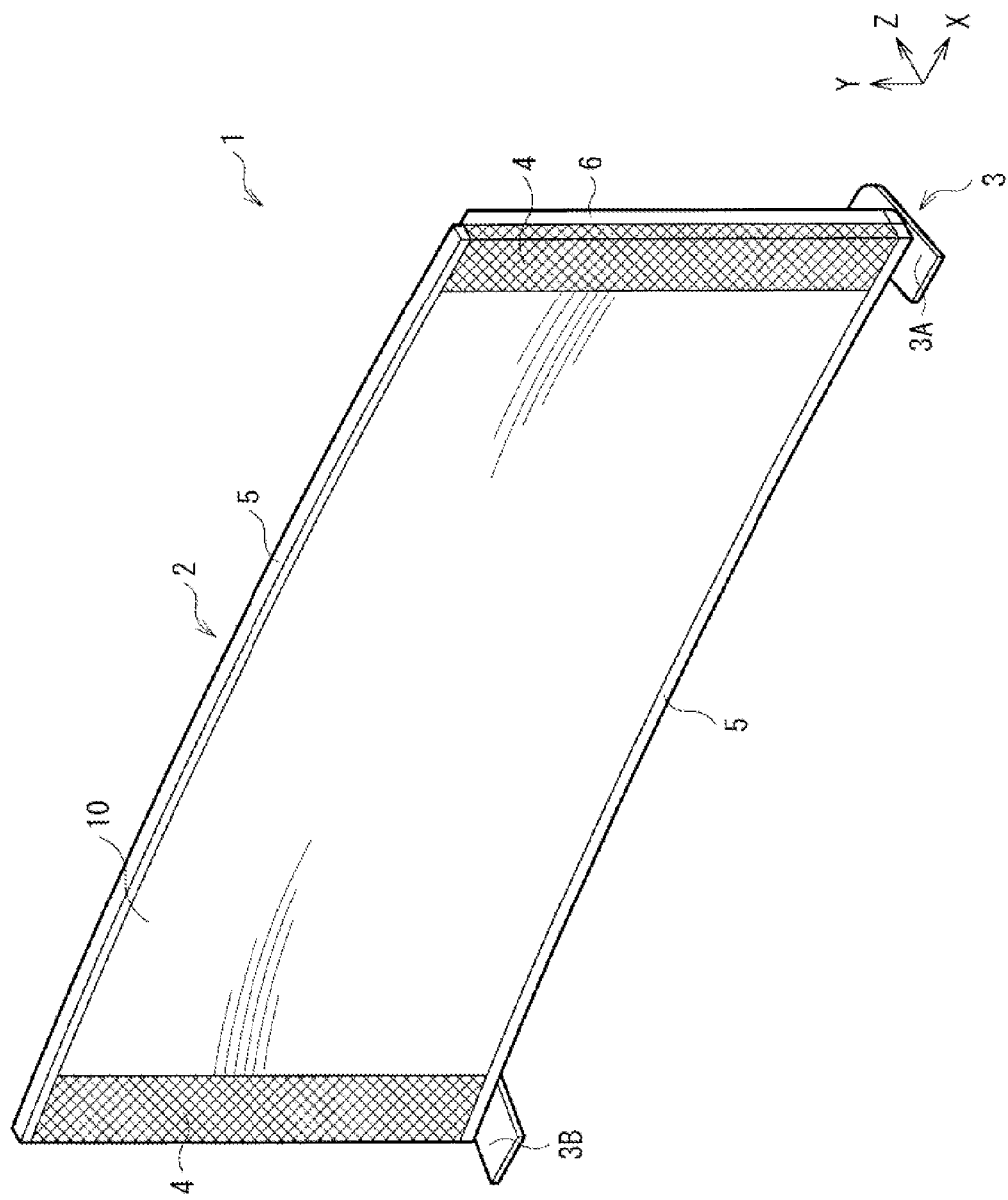
FIG. 1 is a perspective view illustrating an exemplary appearance of a display device according to a first embodiment of the present disclosure as viewed from the front side.
Figure 2:
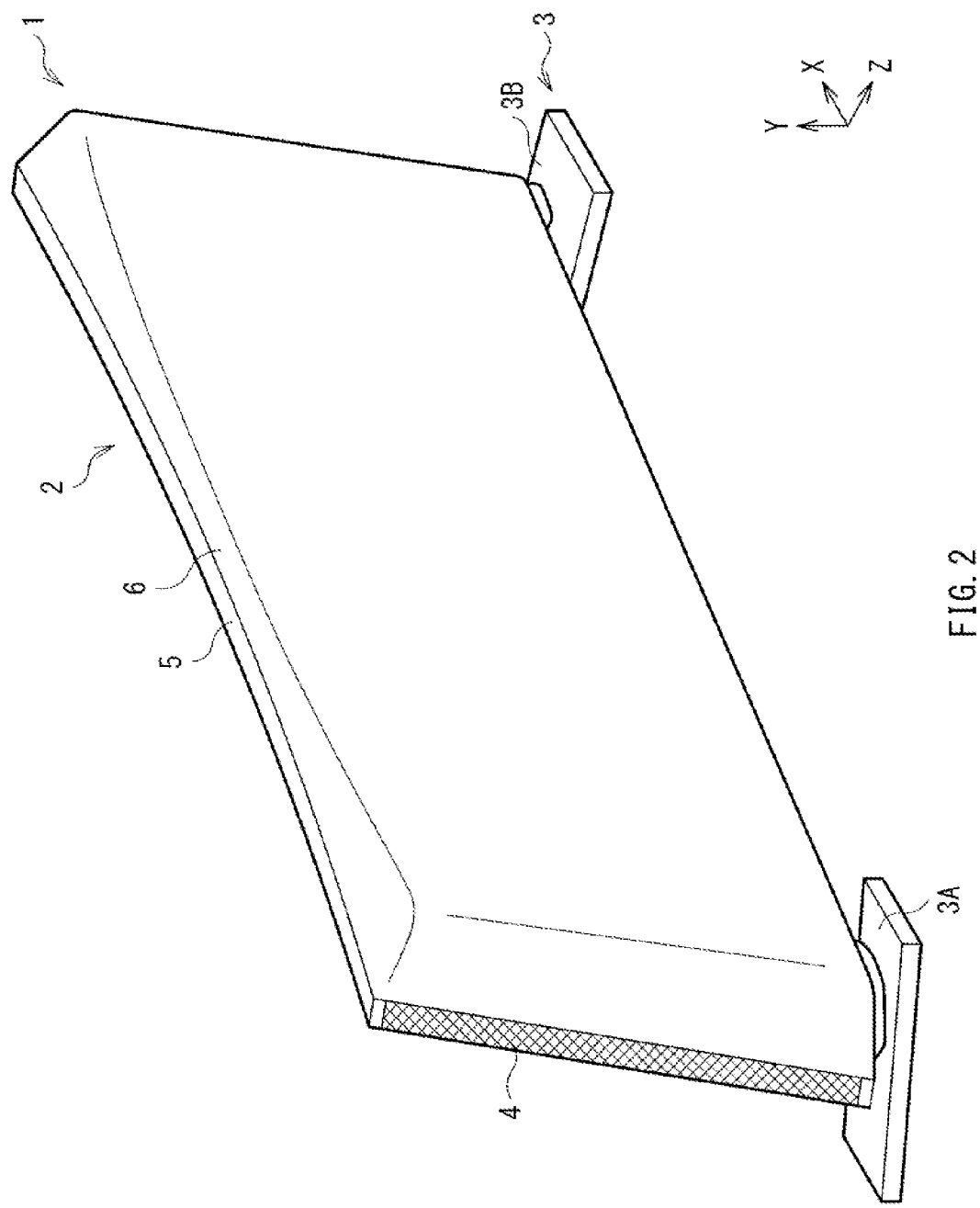
FIG. 2 is a perspective view illustrating the exemplary appearance of the display device illustrated in FIG. 1 as viewed from the rear side.

FIG. 1 is a perspective view illustrating an appearance of a display device according to a first embodiment of the present disclosure as viewed from the front side, and FIG. 2 is a perspective view illustrating the appearance of this display device from the rear side. The display device 1 may be intended for, for example, a television device, and has a configuration in which a flat main body 2 that displays an image is supported by stands 3A and 3B (hereinafter, referred to as stands 3 collectively). The display device 1 is used as a floor-mounted type of display device by being installed on a floor, shelf, rack, or some other flat surface with the stands 3 attached to the main body 2. Also, the display device 1 may be used as a wall-hung type of display device with the stand 3 removed from the main body 2.

Herein, a front-rear direction with respect to the main body 2 is represented by a Z direction, and lateral and vertical directions with respect to a principal surface (largest surface) of the main body 2 are represented by X and Y directions, respectively.

The main body 2 may have, for example, a liquid crystal panel 10 as a display body. Front exterior members 4 are attached to the main body 2 on its respective right and left sides, in order to hide speakers to be described later. A decorative members (front bezels) 5 are mounted on the respective upper and lower sides of the liquid crystal panel 10 and the front exterior members 4. A rear exterior member (rear cover) 6 covers the rear surface of the main body 2.

Figure 3:
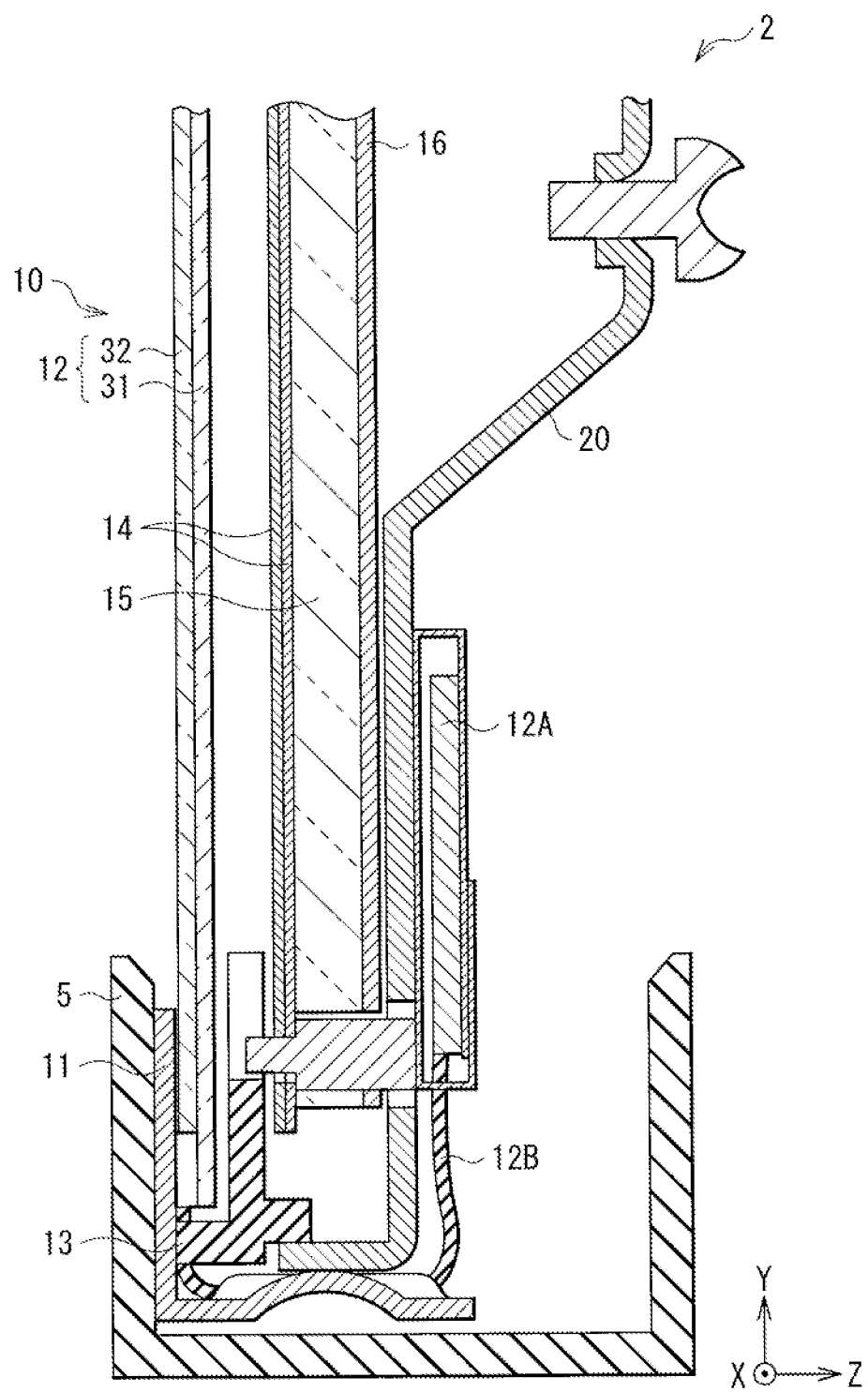
FIG. 3 is a cross-sectional view of an exemplary internal configuration of a center part of a liquid crystal panel illustrated in FIG. 1.

FIG. 3 illustrates an internal configuration of a center part of the liquid crystal panel 10 illustrated in FIG. 1, and illustrates a cross section parallel to the Y direction. The liquid crystal panel 10 includes a front casing (top chassis) 11, a liquid crystal cell 12, a middle casing (middle chassis) 13, optical sheets 14, a light guide plate 15, and a reflector 16 from the front to the rear along the Z direction, in this order. A plate member 20 to be described later is provided in the rear of the reflector 16.

The front casing 11 is a frame-shaped component made of a metal, which covers an outer region on a front surface of the liquid crystal panel 10. The liquid crystal cell 12 may have a configuration, for example, in which a liquid crystal layer (not illustrated in FIG. 3; refer to FIG. 6) is sealed between a first base material 31 and a second base material 32. The liquid crystal cell 12 may be provided with, for example, source drivers (not illustrated) and source substrates 12A. The liquid crystal cell 12 is connected to the source substrates 12A by multiple pieces of COF (Chip on Film) 12B. The middle casing 13 is a frame-shaped component made of a resin, which retains the liquid crystal cell 12 and the optical sheets 14. Each optical sheet 14 may include, for example, a diffusing plate, a diffusing sheet, a lens film, and a polarization split sheet. The light guide plate 15 guides light from a light source (not illustrated) to the liquid crystal panel 10, and may contain, for example, a thermoplastic transparent resin such as a polycarbonate (PC) resin or an acrylic resin (e.g. polymethylmethacrylate (PMMA)), as a main ingredient. The reflector 16 returns light that has been emitted from the rear of the light guide plate to the light guide plate 15, and may be a plate-shaped member or a sheet-shaped member made of, for example, a foamed polyethylene terephthalate (PET), a sliver-evaporated tape, a multilayer reflective film, or a while PET.

The primary components of the liquid crystal panel 10 (excluding the frame-shaped components, the substrates, and so on), that is, the liquid crystal cell 12, the optical sheets 14, the light guide plate 15, and the reflector 16 each may be a thin-plate-shaped or sheet-shaped member made of, for example, a flexible material such as a glass or resin. The liquid crystal panel 10 accordingly exhibits a flexible property on the whole.

Figure 4:
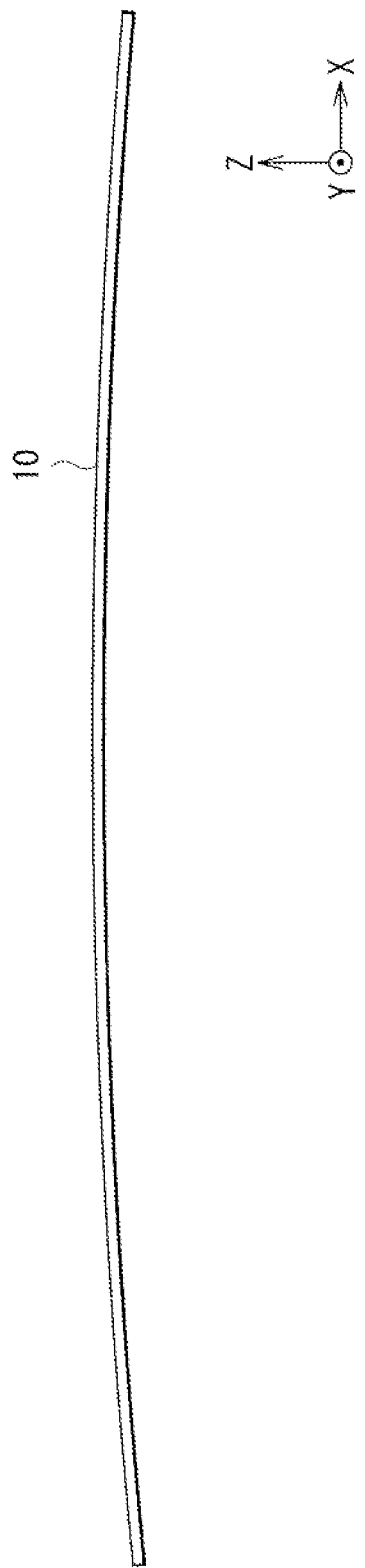
FIG. 4 is a top view of an exemplary curved shape of a liquid crystal panel illustrated in FIG. 1.

The liquid crystal panel 10 is curved in an arc shape in a one-dimensional direction (X direction), as illustrated in FIG. 1. More specifically, desirably the liquid crystal panel 10 may be curved toward the rear side, for example, as illustrated in FIG. 4. When the liquid crystal panel 10 curved in this manner is viewed from the front, the center seems slightly narrower than both the right and left sides (refer to FIG. 13). This makes it possible to provide a viewer with a feeling of unity or immersion by virtue of a visual effect of the perspective.

The curvature of the liquid crystal panel 10 may be preferably uniform in the Y direction. This is because if the curvature is changed in the Y direction, the liquid crystal panel 10 may be partially twisted, in which case the liquid crystal panel 10 could be damaged or cause any display failure.

The speakers (not illustrated) are arranged on the right and left sides of the liquid crystal panel 10 (on the right and left sides of the main body 2) and inside the front exterior members 4 as illustrated in FIG. 1. Arranging the speakers at the right and left sides of the main body 2 makes it possible to visually combine an image and a sound without separating them, thus further intensify the feeling of unity or immersion, in conjunction of the visual effect of the perspective which is produced by the above curved shape of the liquid crystal panel 10.

The plate member 20 illustrated in FIG. 3 retains the liquid crystal panel 10 so as to be curved at a desired curvature. The plate member 20 may be configured with a plate made of, for example, a flexible material such as a metal or resin, the size of which is large enough to entirely cover the rear surface of the liquid crystal panel 10. The plate member 20 may be retained in the desired curved shape with its rear surface fixed to a frame-shaped member (not illustrated) having a curved or bent shape with screws or the like.

The stands 3 illustrated in FIGS. 1 and 2 may be preferably arranged in the main body 2, for example, at its right and left lower sites. A reason for this arrangement is as follows. When the liquid crystal panel 10 is curved toward the rear, the right and left sides of the main body 2 are positioned forwarder than the center of gravity thereof. In this case, the stands 3 are hidden by the main body 2, thus enabling the forward protrusion of the stands 3 from the main body 2 to be made less outstanding than a case where the flat liquid crystal panel 10 is flat. In addition, since the speakers are arranged at the right and left sides of the main body 2, it is possible to reliably support the speakers by using the stands 3 disposed at the right and left lower sites of the main body 2.

The position of the stands 3 is not limited to the right and left lower sites of the main body 2. The stands 3 may be provided at a central lower site of the main body 2. If the liquid crystal panel 10 is curved more sharply, the main body 2 may stand without using the stand 3, that is, by itself. The stands 3A and 3B that are disposed at the left and right sides, respectively, in FIG. 2 may be either separated from or connected to each other.

Figure 5:
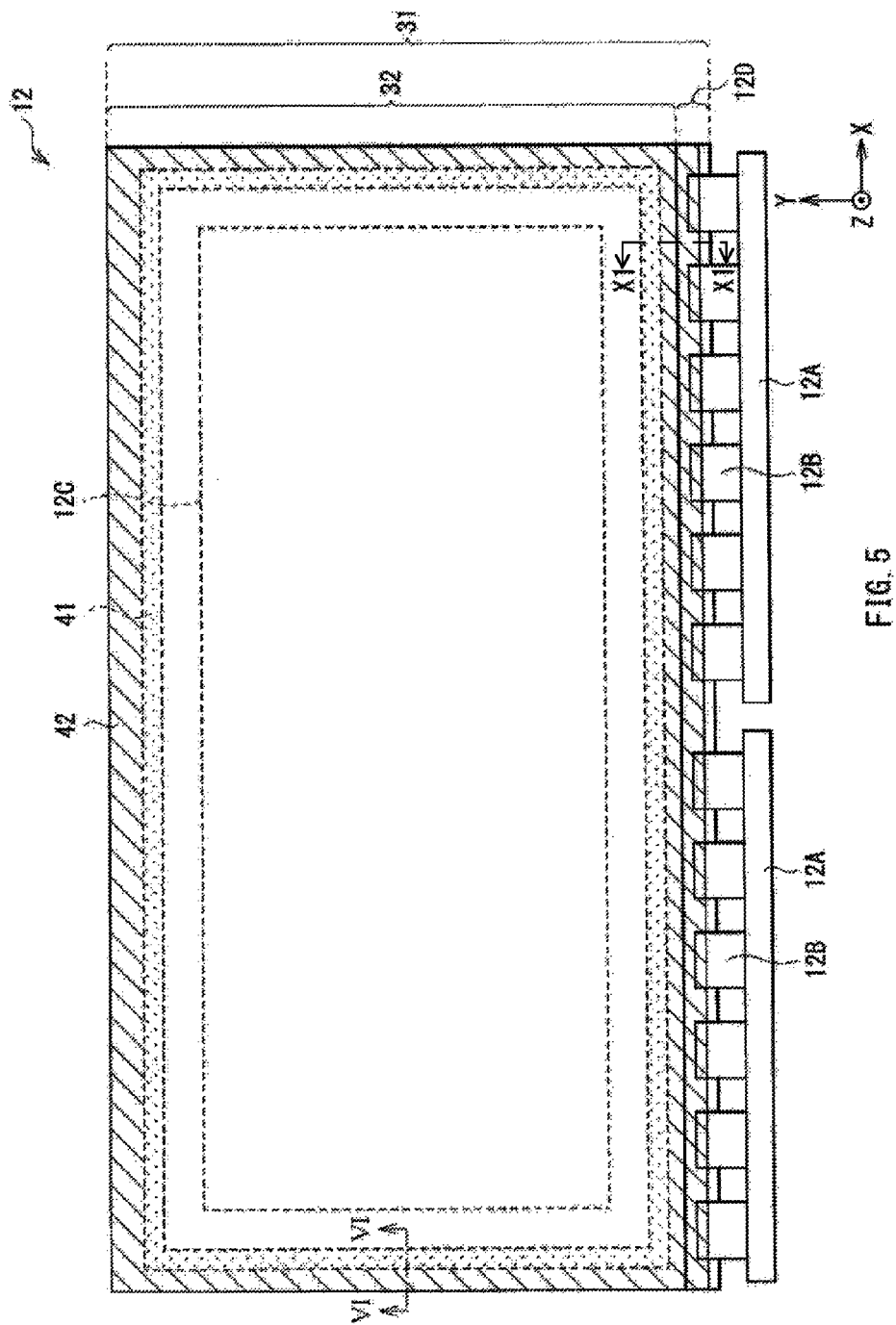
FIG. 5 is a plan view of a liquid crystal cell illustrated in FIG. 3.

FIG. 5 illustrates a planar configuration of the liquid crystal cell 12 illustrated in FIG. 3. The liquid crystal cell 12 has a rectangular shape in a plane which is longer in the X direction, and a display region 12C is provided at its center. The liquid crystal cell 12 has a configuration in which the first base material 31 and the second base material 32 are arranged opposite each other. A liquid crystal display element that contains a liquid crystal layer 33 to be described later (not illustrated in FIG. 5; refer to FIG. 6) is provided between the first base material and the second base material 32. This liquid crystal display element is disposed in the display region 12C disposed at the center of the liquid crystal cell 12.

The liquid crystal cell 12 has an extended region 12D on one side (e.g. a lower side) thereof in which the first base material 31 protrudes from the second base material 32. The extended region 12D is provided with terminals (not illustrated in FIG. 5; refer to FIG. 11) connected to the pieces of COF 12B.

On each of the other three sides of the liquid crystal cell 12, the respective sides of the first base material 31 and the second base material 32 are aligned with each other. In other words, the respective sides of the first base material 31 and the second base material 32 are flush with each other. This configuration conforms to the recent bezel narrowing technique or the gate driver less tendency. However, it is not necessarily necessary for the respective corresponding sides of the first base material 31 and the second base material 32 to be aligned with each other.

Figure 6:
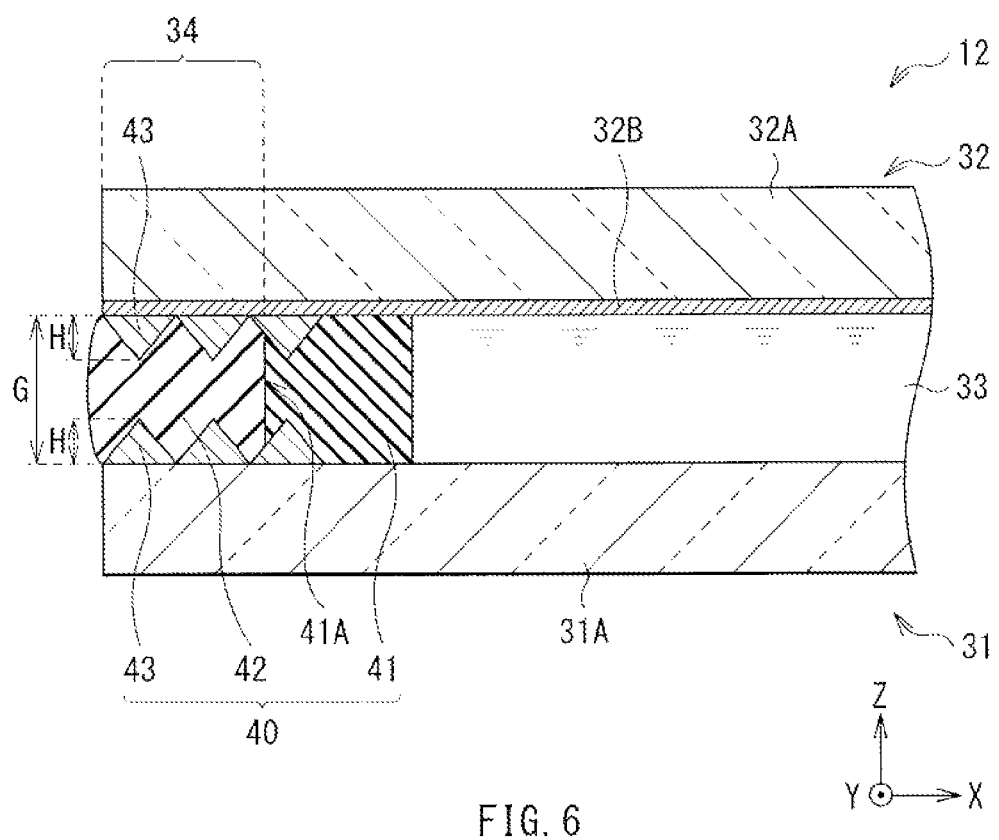
FIG. 6 is a rough cross-sectional view of the liquid crystal cell illustrated in FIG. 5 taken along a line VI-VI.

FIG. 6 illustrates a cross section of a side of the liquid crystal cell 12 illustrated in FIG. 5 on which no extended region 12D is provided, the cross section being taken along a plane perpendicular to the side. Although the liquid crystal display element is provided between the first base material 31 and the second base material 32, as described above, FIG. 6 illustrates only the liquid crystal layer 33 of the liquid crystal display element. The first base material 31 and the second base material 32 have transparent substrates 31A and 32A, respectively. Each of the transparent substrates 31A and 32A may be configured with, for example, a glass substrate, a semiconductor substrate made of silicon, or a substrate made of a flexible material such as plastics.

Although patterns of a metal or resin layer, which configure the liquid crystal display element, are provided on each of the transparent substrates 31A and 32A, FIG. 6 illustrates only a black layer 32B on the transparent substrate 32A as a black matrix and does not illustrate any other metal or resin patterns. The black layer 32B is provided on an inner surface of the transparent substrate 32A, and may be made of, for example, a metal or resin layer.

The liquid crystal cell 12 is provided with a moisture-proof structure 40 that sets the liquid crystal display element (FIG. 6 illustrates only the liquid crystal layer 33) as a moisture-proof target. The moisture-proof structure 40 has a sealing layer 41 and a moisture-proof material 42. The sealing layer 41 surrounds the liquid crystal display element (FIG. 6 illustrates only the liquid crystal layer 33) between the first base material 31 and the second base material 32. The moisture-proof material 42 is provided in contact with an outer side 41A of the sealing layer 41 and in a peripheral section 34 on the first base material 31 and the second base material 32 which is located outside the sealing layer 41. Uneven structures 43 are provided in respective parts of the first base material 31 and the second base material 32 which make contact with the moisture-proof material 42. This makes it possible for the display device 1 to suppress entry of moisture into the sealing layer 41.

The sealing layer 41 also functions as a bonding layer by which the first base material 31 and the second base material 32 are bonded to each other. As illustrated in FIG. 5, the sealing layer 41 is provided in a rectangular frame shape so as to surround the display region 12C. In FIG. 5, an area in which the sealing layer 41 is provided is dotted. The sealing layer 41 may be made of, for example, a thermosetting or ultraviolet curable resin.

The black layer 32B illustrated in FIG. 6 may be preferably provided between the transparent substrate 32A and the sealing layer 41. With the recent development of the bezel narrowing technique, a design is requested in which the black layer 32B extends from a region defined inwardly of the sealing layer 41 to the end of the transparent substrate 32A. The sealing layer 41 may also be made of a thermosetting material, and therefore conforms to the bezel narrowing technique.

The moisture-proof material 42 supports the sealing property of the sealing layer 41, and may be made of, for example, a moisture-proof and insulating material such as a fluorinated resin. Examples of the moisture-proof and insulating material may include "TUFFY (product name)" available from Hitachi Chemical Co., Ltd and "EGC1700" available from Sumitomo 3M Limited. The moisture-proof material 42 may contain a hygroscopic filler as an addition agent.

The moisture-proof material 42 may be preferably provided throughout the peripheral section 34, for example, as illustrated in FIG. 5. Entirely surrounding the sealing layer 41 with the moisture-proof material 42 makes it possible to suppress the deterioration of the sealing layer 41 which would be caused by moisture, thereby enhancing the moisture-proof property of the sealing layer 41. In FIG. 5, an area in which the moisture-proof material 42 is provided is hatched by positively slanting lines.

Each uneven structure 43 is provided with projections (steps or a zigzag pattern) on a surface of the first base material 31 or the second base material 32 to make entry of moisture more difficult than a structure with a flat surface. More specifically, providing the step shapes as the uneven structures 43 increases the resistance between the first base material 31 and the moisture-proof material 42 or between the second base material 32 and the moisture-proof material 42, thereby improving the adhesion therebetween. It is thus possible for the above uneven structures 43 to suppress moisture from entering the sealing layer 41.

A simulation demonstrated that stress was locally applied to the sealing layer 41 in a curved surface panel, in particular, formed by bending, in an arch shape, the liquid crystal panel 10 that had been originally flat, as in this embodiment. On the other hand, the humidity becomes an important parameter to secure the reliability of the sealing layer 41. If entering the sealing layer 41, the moisture may deteriorate the adhesion between the sealing layer 41 and a surrounding contact surface, causing the sealing layer 41 to come it off.

Japanese Unexamined Patent Application Publication No. 2009-080396, as described above, describes that the flat liquid crystal panel is provided with the moisture-proof section on the outer side of the sealing layer. Accordingly, the liquid crystal panel 10 with a curved surface which had only the sealing layer 41 and the moisture-proof material 42 was actually fabricated, and it was subjected to a reliability test including a high temperature and high humidity test. This test result revealed that the liquid crystal panel 10 failed to completely block the entry of the moisture. In particular, the adhesion between the transparent substrate 32A made of a glass and the black layer 32B was lower than that between the transparent substrate 32A and the sealing layer 41. Thus, the adhesion between the transparent substrate 32A and the black layer 32B was deteriorated due to the entry of the moisture.

Also, a curved surface panel is more disadvantageous in adhesion than a flat surface panel, unless both the curvatures of the transparent substrates 31A and 32A are completely identical. In other words, a curved surface panel is more likely to permit the entry of moisture.

In the first embodiment, the respective parts of the first base material 31 and the second base material 32 which make contact with the moisture-proof material 42 are each provided with the uneven structure 43. The uneven structures 43 successfully overcome the above disadvantage with a curved surface panel, thereby improving the moisture-proof property and reliability.

Even when a flat surface panel is used instead of a curved surface panel, a possibility that moisture enters the sealing layer 41 still remains. This is because the distance between the sealing layer 41 and each of transparent substrates 31A and 32A is set short in accordance with the bezel narrowing technique and gate driver less tendency. The first embodiment, however, successfully suppresses entry of moisture into the sealing layer 41 even when a flat surface panel is used, by providing the uneven structures 43. It is thus possible to enhance the reliability.

Preferably, the uneven structures 43 may be provided so as to extend from the respective parts of the first base material 31 and the second base material 32 which make contact with the moisture-proof material 42 to respective parts of the first base material 31 and the second base material 32 which make contact with the sealing layer 41. Providing the step shapes as the uneven structures 43 makes it possible to increase the resistance between the first base material 31 and the sealing layer 41 or between the second base material 32 and the sealing layer 41, thus improving the adhesion therebetween.

Each uneven structure 43 may be preferably configured with patterns of the metal or resin layer provided on the transparent substrate 31A or 32A. The metal or resin layer is a constituent for the liquid crystal display element formed on the transparent substrate 31A or 32A. It is accordingly possible to form the uneven structures 43 simultaneously with the formation of the liquid crystal display element.

For example, the projections of each uneven structure 43, as described above, may have a height H of about 1 μm to 2 μm, and a distance G (or a length of a cell gap) between the first base material 31 and the second base material 32 may be about 3 μm to 4 μm.

Figure 7:
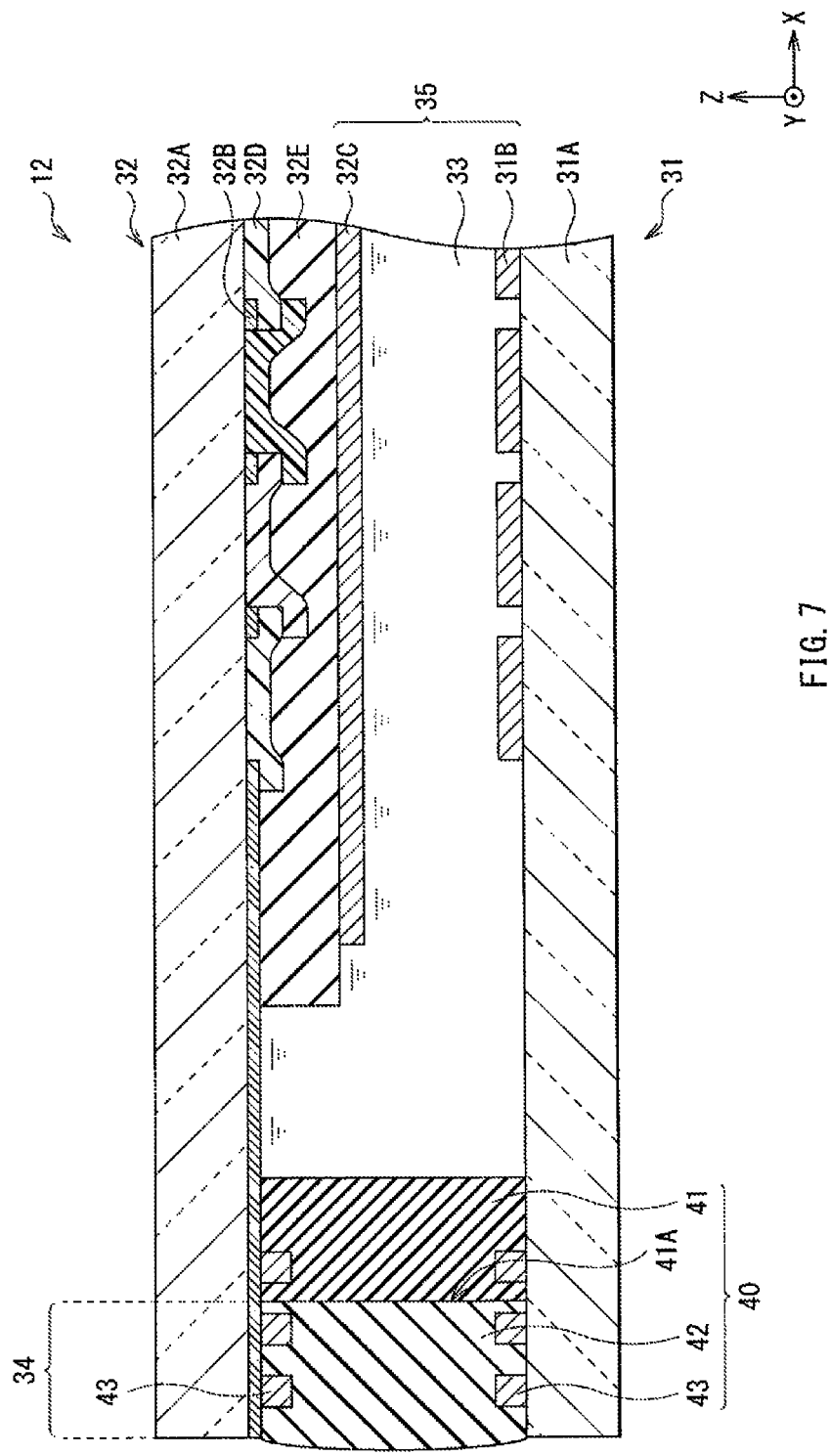
FIG. 7 is a cross-sectional view of an example of uneven structures illustrated in FIG. 6.

FIG. 7 illustrates an example of the uneven structures 43. Furthermore, FIG. 7 illustrates an exemplary cross-sectional configuration of the uneven structures 43 and the liquid crystal display element. The liquid crystal display element 35 may include, for example, pixel electrodes 31B, a common electrode (counter electrode) 32C, and the liquid crystal layer 33 provided between the pixel electrodes 31B and the common electrode 32C. The pixel electrodes 31B are provided on the transparent substrate 31A of the first base material 31, and may be each configured with a pattern of a metal layer made of, for example, indium tin oxide (ITO). The common electrode 32C is provided below the transparent substrate 32A of the second base material 32, and may be configured with a pattern of a metal layer made of, for example, ITO. The above black layer 32B as a black matrix, color filters 32D, and an overcoat layer 32E are provided between the transparent substrate 32A and the common electrode 32C. Each of the black layer 32B, the color filters 32D, and the overcoat layer 32E may be a pattern of a resin layer made of, for example, a resin.

The uneven structure 43 on the first base material 31 may be configured with, for example, patterns of the metal layer that configures the pixel electrodes 31B of the liquid crystal display element 35. The uneven structure 43 on the second base material 32 may be configured with, for example, patterns of the metal layer that configures the common electrode 32C of the liquid crystal display element 35. Alternatively, the uneven structure 43 on the first base material 31 may be formed using patterns of a metal layer other than that for the pixel electrodes 31B, for example, wires of TFTs (not illustrated) provided in a layer under the pixel electrode 31B.

Figure 8:
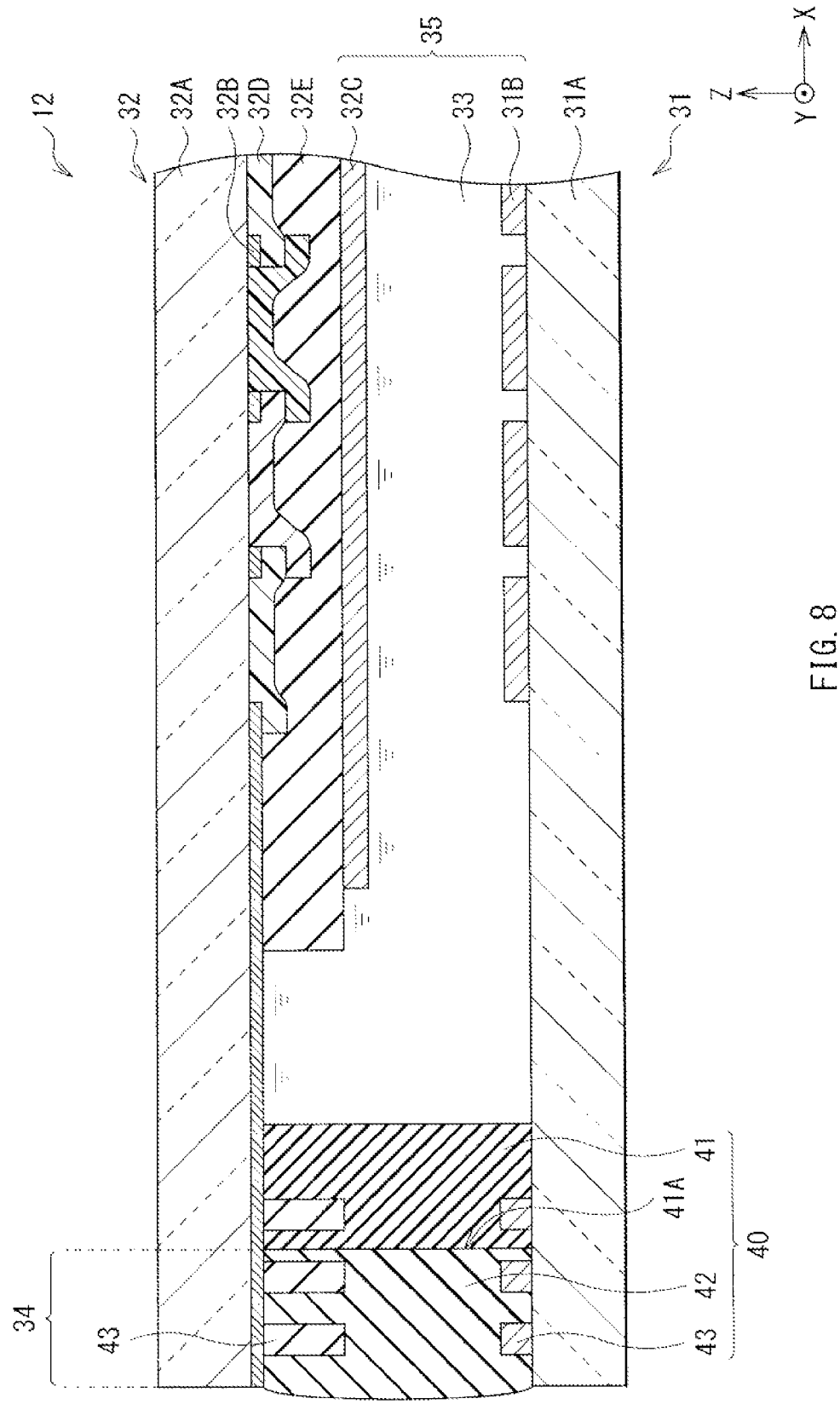
FIG. 8 is a cross-sectional view of another example of the uneven structures illustrated in FIG. 6.

FIG. 8 illustrates another example of the uneven structure 43. In this example, the uneven structure 43 on the second base material 32 may be configured with, for example, patterns of the resin layer that configures the overcoat layer 32D. Since the overcoat layer 32D has a thickness of as large as about 2 μm to 3 μm, it is possible to enhance the effect of suppressing the entry of moisture by increasing the height of the projections (steps) in the uneven structure 43. The uneven structure 43 on the second base material 32 may be formed using patterns of a resin layer other than that for the overcoat layer 32D, for example, that for the color filters 32D.

The configurations illustrated in FIGS. 7 and 8 may be combined. That is, the patterns of the metal layer configuring the pixel electrodes 31B of the liquid crystal display element 35 and the patterns of the resin layer configuring the overcoat layer 32 may be used in combination, as the uneven structure 43 on the second base material 32.

Figure 9:
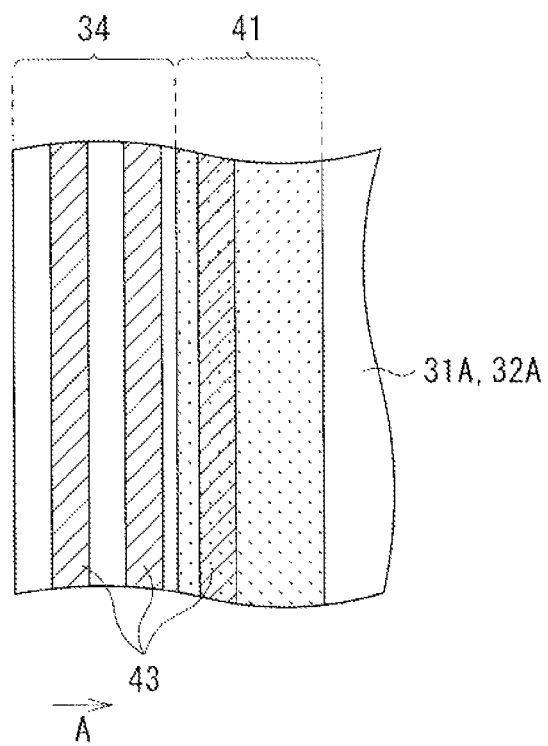
FIG. 9 is a plan view of an example of the uneven structures illustrated in FIG. 6.
Figure 10:
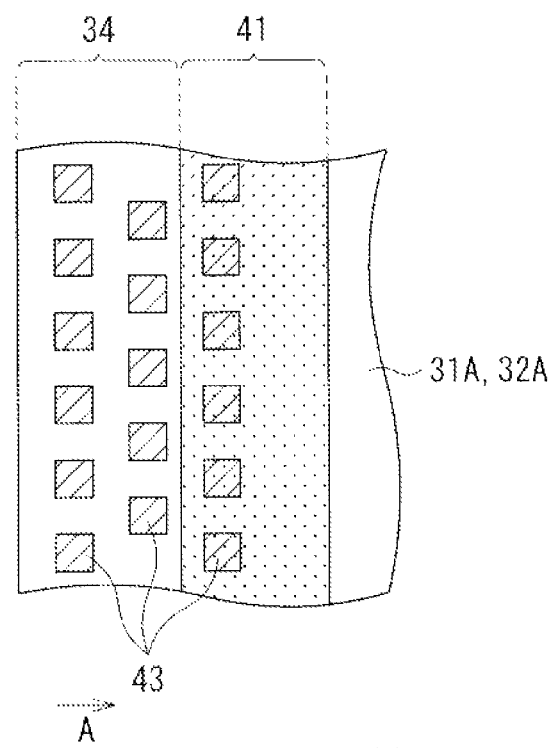
FIG. 10 is a plan view of another example of the uneven structures illustrated in FIG. 6.

FIGS. 9 and 10 illustrate an exemplary planar configuration of each uneven structure 43. As illustrated in FIG. 9, for example, it is effective for the uneven structure to constitute a ladder pattern including a plurality of linear patterns extending in a direction intersecting (more specifically, perpendicular to) a moisture entry direction A. Alternatively, a dot pattern is also preferable, as illustrated in FIG. 10. Since the uneven structure 43 arranged in the dot pattern reliably blocks moisture entry routes in the entire sealing layer 41, it is preferable for the uneven structures 43 to be arranged, for example, in a staggered fashion (dots are arranged in multiple arrays in a staggered fashion, and each dot in one array is positioned in the middle of the spacing between dots in another array). The planar shape formed by the dots is not limited to square as illustrated in FIG. 10, and may be rectangular, circular, oval, or the like.

Figure 11:
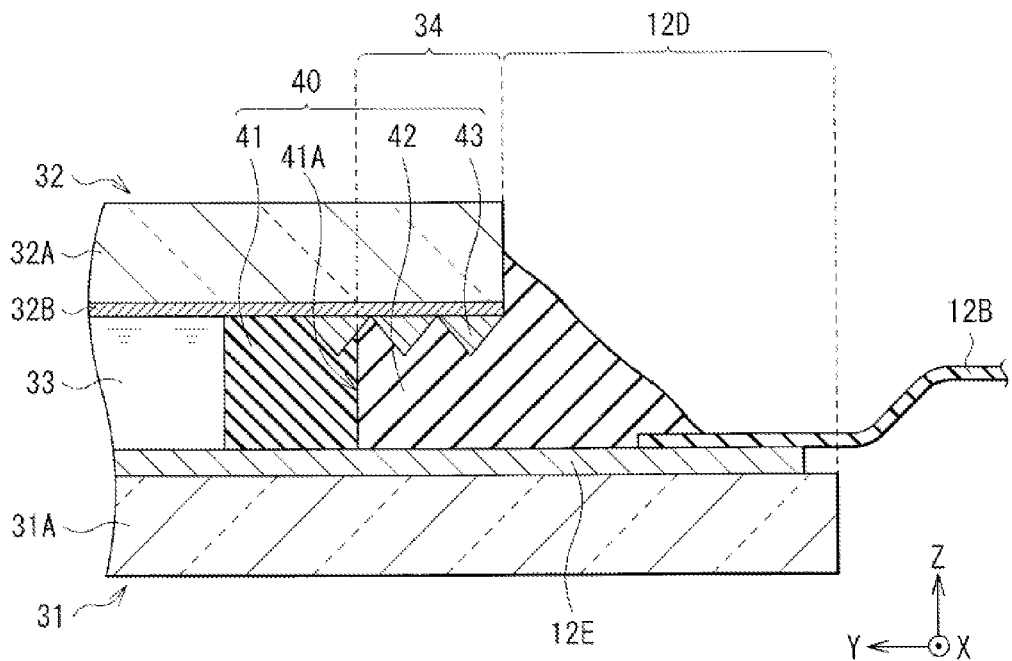
FIG. 11 is a rough cross-sectional view of the liquid crystal cell illustrated in FIG. 5 taken along a line XI-XI.

FIG. 11 illustrates a cross section of the extended region 12D illustrated in FIG. 5 taken along the Y direction. The terminals 12E are provided in the extended region 12D, as described above. The terminals 12E are formed by extending the pixel electrodes 31B in the display region 12C on the transparent substrate 31A of the first base material 31 to the peripheral section 34. The terminals 12E are connected at their ends to the corresponding pieces of COF 12B.

The moisture-proof material 42 in the extended region 12D is provided in contact with the outer side 41A of the sealing layer 41 and in the peripheral section 34 on the first base material 31 and the second base material 32 which is located outside the sealing layer 41, similar to the moisture-proof material 42 on the other sides as illustrated in FIG. 5.

Preferably, the moisture-proof material 42 in the extended region 12D may extend from the outer side 41A of the sealing layer 41 to the ends of the pieces of the COF 12B in the Y direction, as illustrated in FIG. 11. Currents flowing through the terminals 12E may provoke a battery reaction with moisture in the atmosphere, causing the corrosion of the terminals 12E. Entirely coating the surfaces of the terminals 12E with the moisture-proof material 42 makes it possible to prevent the terminals 12E from being exposed to the atmosphere, thereby suppressing the corrosion of the terminals 12E. In addition, the moisture-proof material 42 may partially coat the side of the transparent substrate 32A of the second base material 32, as illustrated in FIG. 11.

The uneven structure 43 may be provided in the extended region 12D as appropriate, in accordance with the arrangement of the terminals 12E. For example, assuming that the terminals 12E are provided on the first base material 31 in the extended region 12D, as illustrated in FIG. 11, the uneven structure 43 may be provided only in part of the second base material 32 which makes contact with the moisture-proof material 42.

Figure 12:
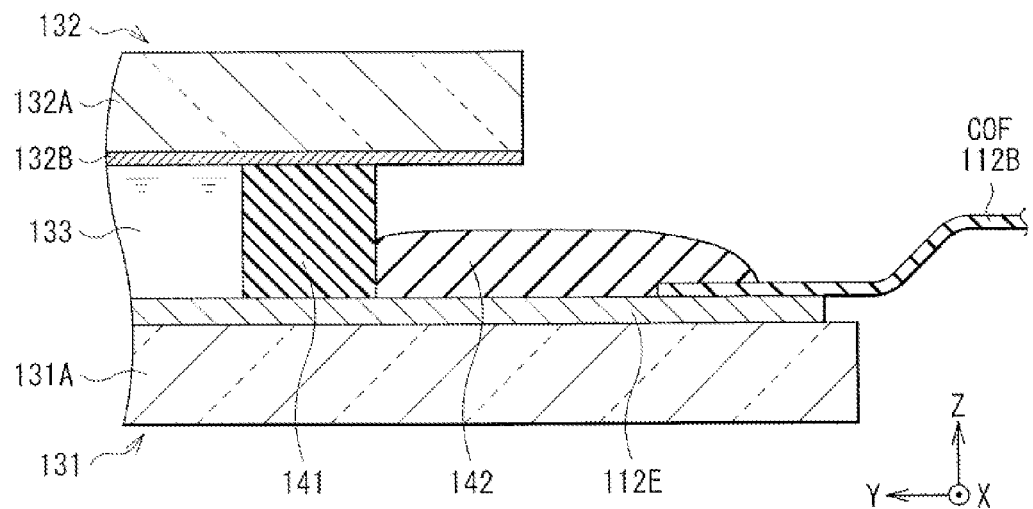
FIG. 12 is a cross-sectional view used to explain a difference from a terminal coating film in an existing liquid crystal cell.

In a certain existing display device, as illustrated in FIG. 12, a terminal coating film 142 is provided so as to extend from the surfaces of terminals 112E to ends of pieces of COF 112B. The terminal coating film 142 does not entirely cover a peripheral region 134 on the first base material 131 and the second base material 132 which is located outside a sealing layer 141. It is therefore difficult to suppress moisture from entering the sealing layer 141. In FIG. 12, the same constituents as those of FIG. 11 are given the same reference numerals with the addition of 100.

The display device 1 configured above may be manufactured through the following processing.

The transparent substrate 31A made of a glass or the like is first prepared. Then, driver circuits (not illustrated) configured with TFTs and the like and metal wires (not illustrated) are formed in the transparent substrate 31A, and the surface of the transparent substrate 31A is planarized with an organic insulating layer (not illustrated). After that, the pixel electrodes 31B configured with the patterns of the metal layer are formed on the organic insulating layer. In this case, the uneven structure 43 is formed in the peripheral section 34 with the patterns of the same metal layer as that for the pixel electrodes 31B. As a result, the first base material 31 is formed.

Next, the transparent substrate 32A made of a glass or the like is prepared, and the black layer 32B and the color filters 32D are formed on the transparent substrate 32A. Then, the black layer 32B and the color filters 32D are coated with the overcoat layer 32E, and the uneven surface, which is created due to a difference in thickness among the color filters 32D of different colors, is planarized. Moreover, the common electrode 32C configured with the pattern of the metal layer is formed on the overcoat layer 32E.

When the common electrode 32C is formed, the uneven structure 43, configured with the patterns of the same metal layer as that for the common electrode 32C, is formed in the peripheral section 34, as illustrated in FIG. 7. Alternatively, the uneven structure 43, configured with the patterns of the same resin layer as that for the overcoat layer 32E, may be formed in the peripheral section 34, as illustrated in FIG. 8. Furthermore, both processes may be performed in combination. As a result, the second base material 32 is formed.

Thereafter, the sealing layer 41 is formed in a bezel region of the first base material 31, for example, with a thermosetting or ultraviolet curable resin. The sealing layer 41 is formed in a rectangular flame shape so as to surround the display region 12C and to form an inlet (not illustrated) to be opened on one side of the first base material 31.

Then, an oriented film (not illustrated) is formed in the display region 12C of the first base material 31, and an oriented film (not illustrated) is formed in the display region 12C of the second base material 32. After that, the first base material 31 and the second base material 32 are positioned opposite each other with the sealing layer 41 therebetween, and they are bonded to each other by curing the resin configuring the sealing layer 41.

Then, the liquid crystal is injected into a space between the first base material 31 and the second base material 32, so that the liquid crystal layer 33 is formed therebetween. Thereafter, the moisture-proof material 42 is applied to the interior of the peripheral section 34. In this case, it is preferable to ensure that the moisture-proof material 42 is filled in a space between the projections (the steps or the zigzag pattern) of the uneven structures 43. Through the above processing, the liquid crystal cell 12 as illustrated in FIGS. 5 and 6 is formed.

Thereafter, the plate member 20 curved in a desired arc shape is prepared, and the reflector 16, the light guide plate 15, and the optical sheets 14 are mounted on the surface of the plate member 20. In addition, backlight components such as a heat sink and a light source (all not illustrated) are mounted thereon. After that, the middle casing 13 is mounted on the outer region of the plate member 20. Then, the liquid crystal cell 12 is attached to the middle casing 13, and the front casing 11 is attached to the front outer region of the liquid crystal cell 12. As a result, the liquid crystal panel 10 is created.

The primary constituents (excluding the frame-shaped components, substrates, etc.) for the liquid crystal panel 10, more specifically, the liquid crystal cell 12, the optical sheets 14, the light guide plate 15, and the reflector are each configured with a thin-plate-shaped or sheet-shaped flexible member made of a material such as a glass or resin. The liquid crystal panel 10 accordingly exhibits a flexible property on the whole. Thus, the liquid crystal panel 10 is curved in an arc shape in conformity with the shape of the plate member 20.

After the liquid crystal panel 10 is created, the speakers (not illustrated) are attached to the front casing 11, and a substrate and the like (not illustrated) are mounted on the rear surface of the plate member 20. Then, the speakers (not illustrated) are hidden by the front exterior members 4, and the decorative members 5 are mounted on the respective upper and lower sides, of the liquid crystal panel 10 and the front exterior members 4. As a result, the main body 2 is created. After that, the rear surface of the main body 2 is covered by the rear exterior member 6, and the stands 3 are attached to the main body 2 on its right and left lower sides. Through the above processing, the display device 1 as illustrated in FIG. 1 is completed.

Figure 13:
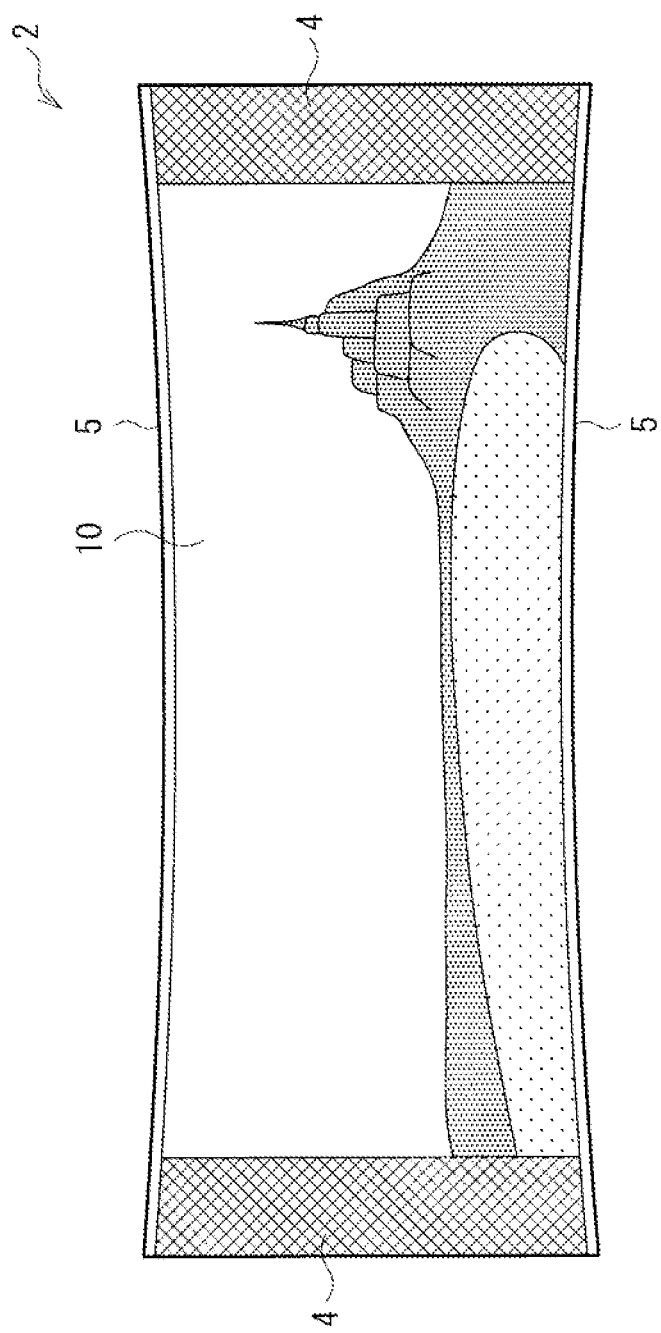
FIG. 13 is a schematic front view of an exemplary display state of the display device illustrated in FIG. 1.

The display device 1 displays an image by allowing light from the light source (not illustrated) to selectively pass through the liquid crystal panel 10. The liquid crystal panel 10 is curved toward the rear side in the one-dimensional direction (X direction) so as to form an arc shape. When the liquid crystal panel 10 is viewed from the front, the center seems slightly narrower than both the right and left sides, as illustrated in FIG. 13. This appearance makes it possible to provide a viewer with the feeling of unity or immersion by virtue of a visual effect of the perspective. Specifically, the display device 1 can provide realistic viewing which makes a viewer feel like being in a theater, in particular, when displaying movie contents.

Since the speakers (not illustrated) are arranged on the right and left sides, respectively, of the liquid crystal panel 10, they visually combine an image and a sound without separating them. It is thus possible to intensify the feeling of unity or immersion, in conjunction of the visual effect of the perspective which is produced by the above curved shape of the liquid crystal panel 10.

In the display device 1 described above, the uneven structures 43 are provided in the part of the first base material 31 that makes contact with the moisture-proof material 42 and in the part of the second base material 32 that makes contact with the moisture-proof material 42. Providing the step shapes as the uneven structures 43 increases the resistance between the first base material 31 and the moisture-proof material 42 or between the second base material 32 and the moisture-proof material 42, thereby improving the adhesion therebetween. Thus, the uneven structures 43 successfully suppress moisture from entering the sealing layer 41. If moisture attempts to enter the sealing layer 41, it reaches the uneven structure before reaching the sealing layer 41. Then, the moisture is blocked by the uneven structures 43, because moisture has difficulty moving beyond the step. Therefore, the moisture is less likely to further move toward the sealing layer 41. Thus, the moisture is suppressed from entering the sealing layer.

In the first embodiment, the uneven structures 43 are provided in the part of the first base material 31 that makes contact with the moisture-proof material 42 and in the part of the second base material 32 that makes contact with the moisture-proof material 42, as described above. The uneven structures 43 serve as a physical resistance against entry of moisture, thereby successfully suppressing the moisture from entering the sealing layer 41. The first embodiment is suitable especially for a structure in which a distance between the sealing layer 41 and each of the transparent substrates 31A and 32A decreases in accordance with the bezel narrowing technique.

[Modification 1-1]

Figure 14:
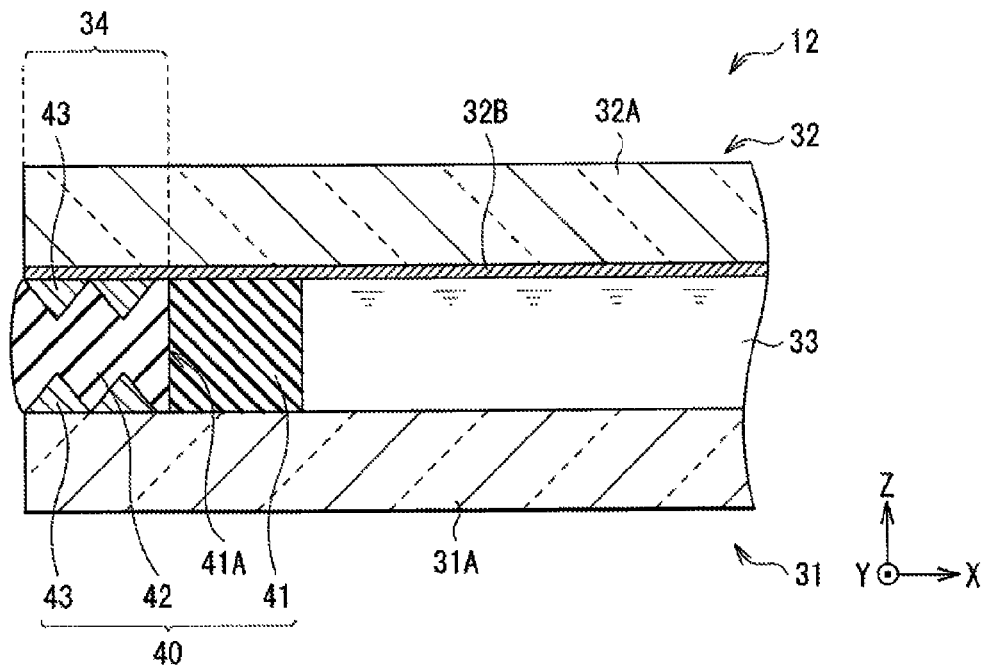
FIG. 14 is a rough cross-sectional view of a liquid crystal cell according to a modification 1-1.

In the above first embodiment, as illustrated in FIG. 6, the description has been given regarding the case where the uneven structures 43 are provided so as to extend from the respective parts of the first base material 31 and the second base material 32 which make contact with the moisture-proof material 42 to the respective parts of the first base material 31 and the second base material 32 which make contact with the sealing layer 41. The uneven structures 43, however, may be provided only in respective parts of the first base material 31 and the second base material 32 which make contact with the moisture-proof material 42, as illustrated in FIG. 14.

[Modification 1-2]

Figure 15:
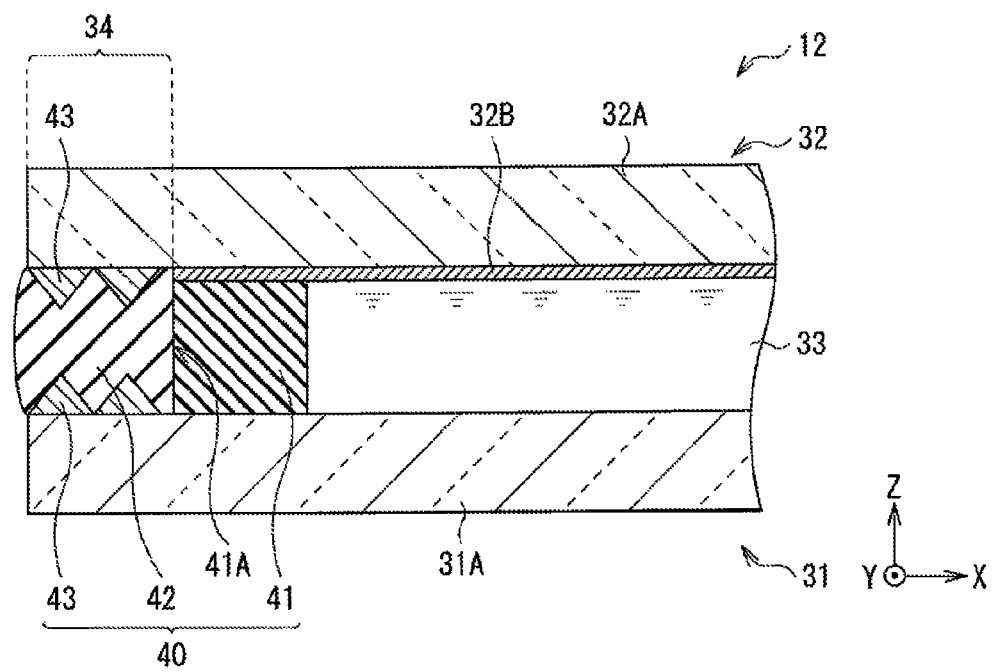
FIG. 15 is a rough cross-sectional view of a liquid crystal cell according to a modification 1-2.

In the above first embodiment, the description has been given regarding the case where the black layer 32B is provided so as to extend to the end of the transparent substrate 32A. It is, however, not necessarily necessary to provide the black layer 32B in the peripheral section 34. Alternatively, the black layer 32B may be provided in regions between the transparent substrate 32A and the sealing layer 41 and defined inwardly of the sealing layer 41, for example, as illustrated in FIG. 15.

[Second Embodiment]

Figure 16:
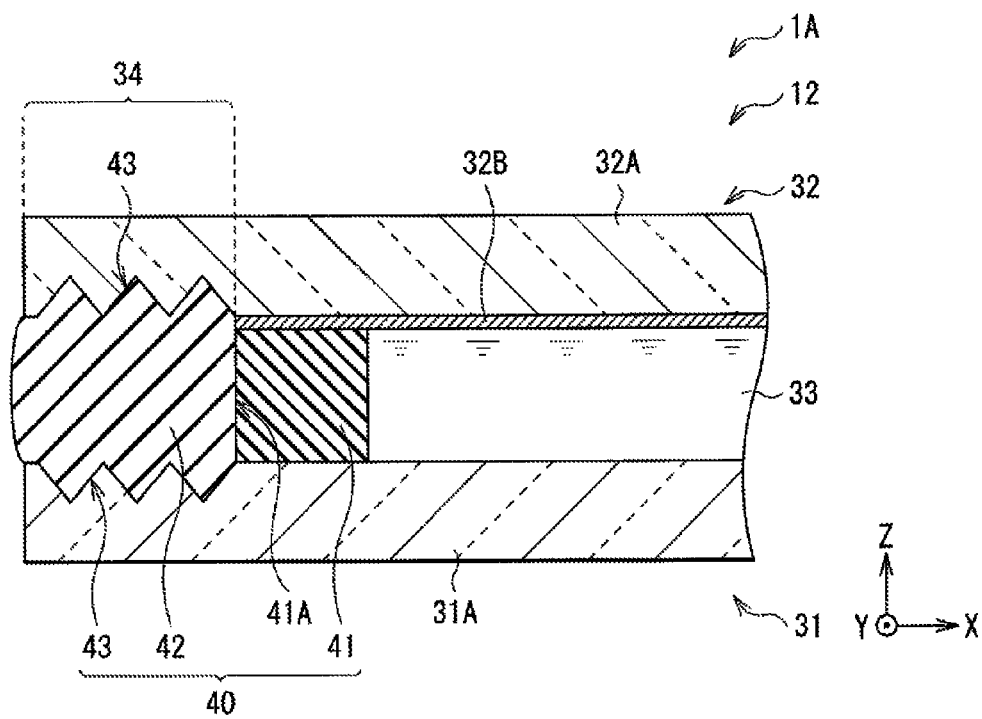
FIG. 16 is a rough cross-sectional view of a liquid crystal cell in a display device according to a second embodiment of the present disclosure.

FIG. 16 roughly illustrates a cross-sectional configuration of the liquid crystal cell 12 in a display device 1A according to a second embodiment of the present disclosure. The display device 1A has the same configuration, function, and effect as the above first embodiment, with the exception that the uneven structures 43 are formed by cutting or scratching the surfaces of the transparent substrates 31A and 32A. It is therefore possible to manufacture the display device 1A through the same processing as that for the first embodiment.

[Modification 2-1]

Figure 17:
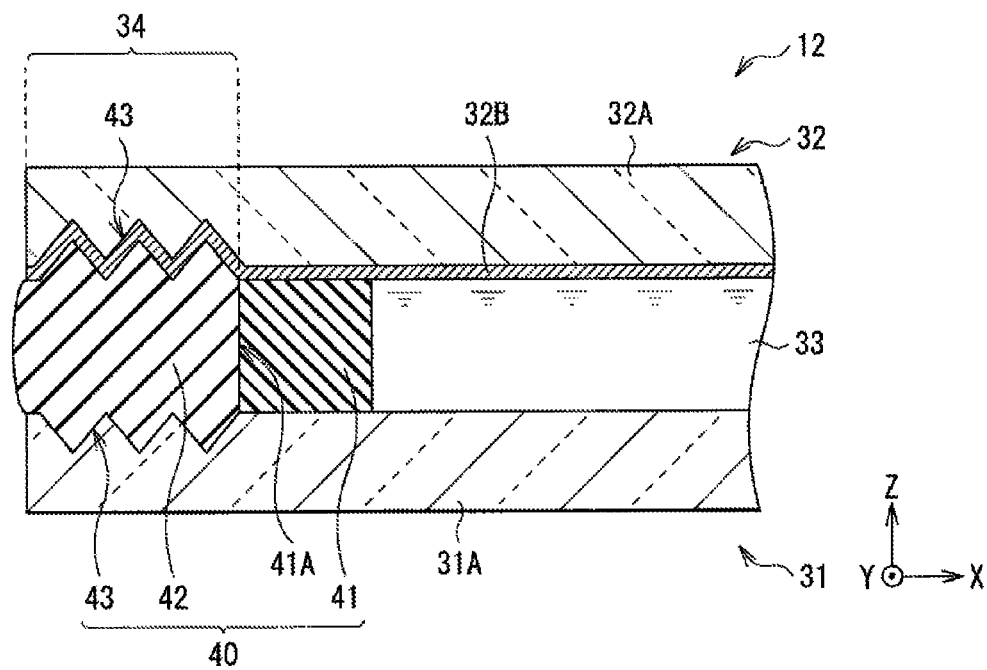
FIG. 17 is a rough cross-sectional view of a liquid crystal cell according to a modification 2-1.

In FIG. 16, the black layer 32B is provided in the region between the transparent substrate 32A and the sealing layer 41 and defined inwardly of the sealing layer 41. The black layer 32B, however, may be provided so as to extend to the end of the transparent substrate 32A, as illustrated in FIG. 17, in which case the black layer 32B in the peripheral section 34 is provided on the uneven structure 43.

Moreover, in the second embodiment, although not illustrated, the uneven structures 43 may also be provided so as to extend from the respective parts of the first base material 31 and the second base material 32 which make contact with the moisture-proof material 42 to the respective parts of the first base material 31 and the second base material 32 which make contact with the sealing layer 41, similar to the first embodiment.

[Third Embodiment]

Figure 18:
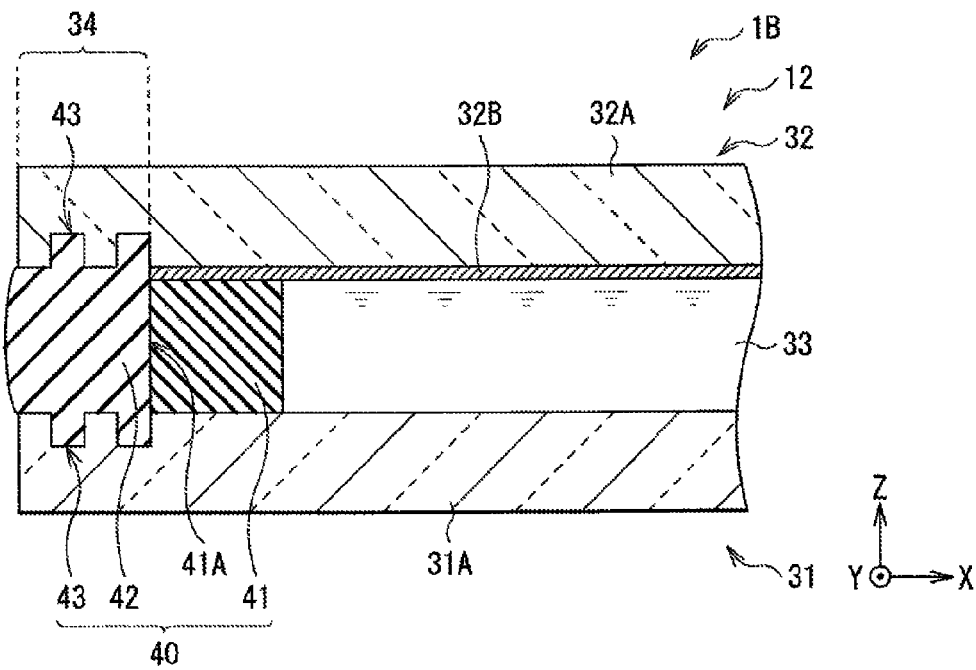
FIG. 18 is a rough cross-sectional view of a liquid crystal cell in a display device according to a third embodiment of the present disclosure.

FIG. 18 roughly illustrates a cross-sectional configuration of the liquid crystal cell 12 in a display device 1B according to a third embodiment of the present disclosure. The display device 1B has the same configuration, function, and effect as the above first embodiment, with the exception that the uneven structures 43 are configured with grooves formed in the transparent substrates 31A and 32A. It is therefore possible to manufacture the display device 1B through the same processing as that for the first embodiment.

The uneven structures 43 of the third embodiment may be formed through mechanical polishing, for example, using cesium oxide ($CeO_2$).

In the third embodiment, although not illustrated, the black layer 32B may also be provided so as to extend to the end of the transparent substrate 32A, similar to the modification 2-1, in which case the black layer 32B is also provided on the uneven structure 43 in the peripheral section 34.

Moreover, in the third embodiment, although not illustrated, the uneven structures 43 may also be provided so as to extend from the respective parts of the first base material 31 and the second base material 32 which make contact with the moisture-proof material 42 to the respective parts of the first base material 31 and the second base material 32 which make contact with the sealing layer 41, similar to the first embodiment.

[Fourth Embodiment]

Figure 19:
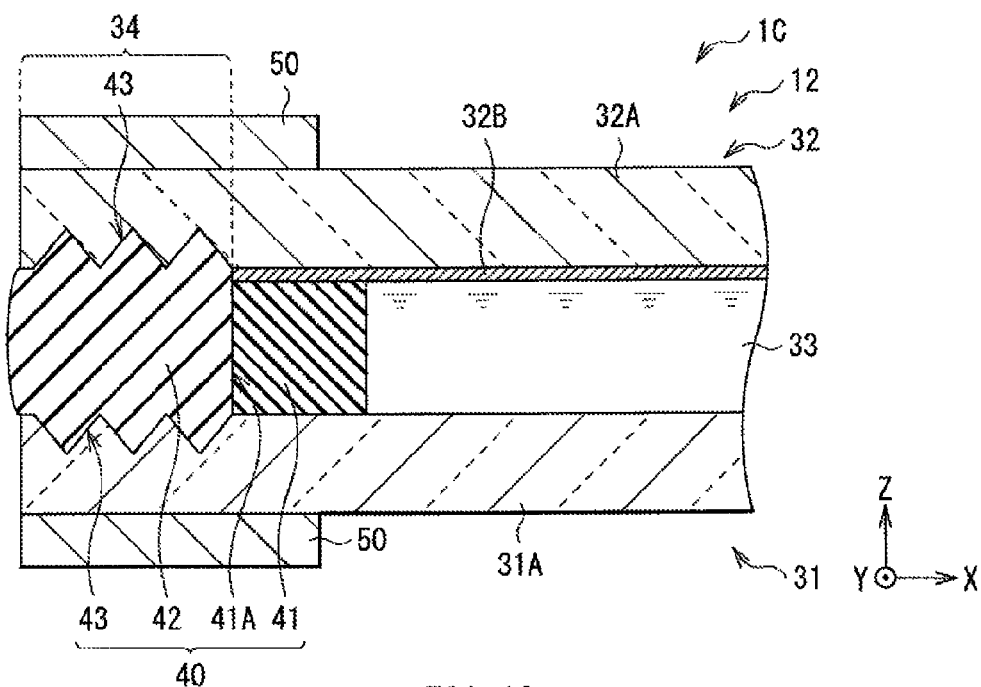
FIG. 19 is a rough cross-sectional view of a liquid crystal cell in a display device according to a fourth embodiment of the present disclosure.

FIG. 19 roughly illustrates a cross-sectional configuration of the liquid crystal cell 12 in a display device 1C according to a fourth embodiment of the present disclosure. The display device 1C has the same configuration, function, and effect as the above second embodiment, with the exception that presser members 50 are provided on outer surfaces of the second base material 31 and the second base material 32 in the peripheral section 34. It is therefore possible to manufacture the display device 1C through the same processing as that for the second embodiment.

The presser members 50 press the end regions of the first base material 31 and the second base material 32, thereby making the first base material 31 and the second base material 32 less likely to be peeled. As a result, the moisture-proof property of the display device 1C is further enhanced. It is therefore possible to suppress the peeling of the first base material 31 and the second base material 32, thereby securing the moisture-proof property, in particular, when the liquid crystal cell 12 is curved as in the first embodiment.

The presser members 50 also function as reinforce members that compensate the strength of the first base material 31 and the second base material 32. The fourth embodiment is suitable for, in particular, the case where the uneven structures 43 are formed by cutting or scratching the respective surfaces of the transparent substrates 31A and 32A as in the second embodiment or the case where the grooves are provided in the transparent substrates 31A and 32A as the uneven structures 43 as in the third embodiment.

The presser members 50 may be made of, for example, a polymer sheet, and be, for example, about 0.5 mm thick.

[Modification 4-1]

Figure 20:
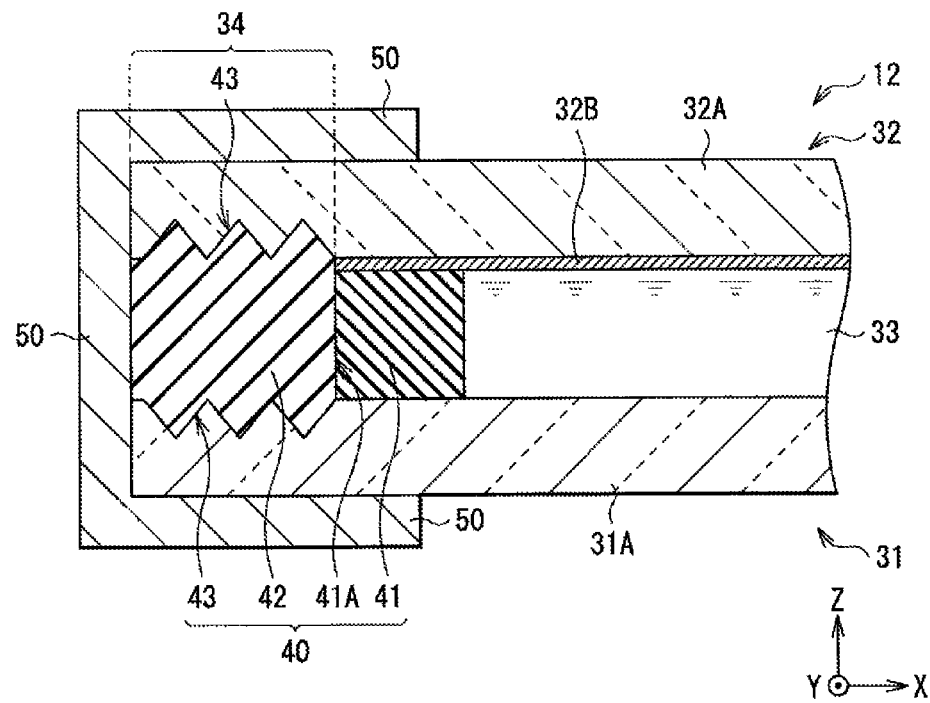
FIG. 20 is a rough cross-sectional view of a liquid crystal cell according to a modification 4-1.

FIG. 20 roughly illustrates a cross-sectional configuration of the liquid crystal cell 12 according to a modification 4-1. In the modification 4-1, the presser member has three rectangular sides, and wraps the end of the liquid crystal cell 12, further enhancing the moisture-proof effect.

[Fifth Embodiment]

Figure 21:
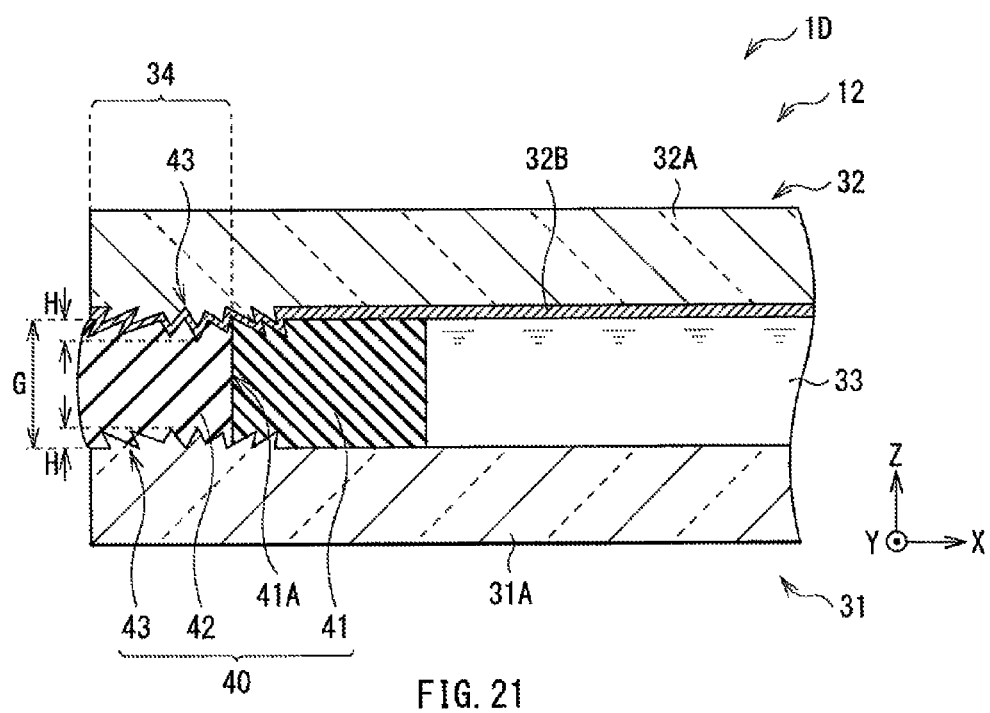
FIG. 21 is a rough cross-sectional view of a liquid crystal cell in a display device according to a fifth embodiment of the present disclosure.

FIG. 21 roughly illustrates a cross-sectional configuration of the liquid crystal cell 12 in a display device 1D according to a fifth embodiment of the present disclosure. The display device 1D has the same configuration, function, and effect as the above first embodiment, with the exception that the uneven structures 43 are configured with the surface roughness of the transparent substrates 31A and 32A. It is therefore possible to manufacture the display device 1C through the same processing as that for the first embodiment.

The uneven structures 43 of the fifth embodiment is formed such that only the transparent substrates 31A and 31B in the peripheral section 34 are unpolished and the rough surface (nonuniform or uneven surface) of bare glass is left during the manufacturing process. In the fifth embodiment, the projections of each uneven structure 43 may have a height H of, for example, about 0.3 μm to 0.7 μm.

In FIG. 21, the uneven structures 43 are provided so as to extend from the respective parts of the first base material 31 and the second base material 32 which make contact with the moisture-proof material 42 to the respective parts of the first base material 31 and the second base material 32 which make contact with the sealing layer 41. In the fifth embodiment, however, although not illustrated, the uneven structures 43 may also be provided only in the respective parts of the first base material 31 and the second base material 32 which make contact with the moisture-proof material 42, similar to the modification 1-1.

In FIG. 21, the black layer 32B is provided so as to extend to the end of the transparent substrate 32A. In the fifth embodiment, it is not, however, necessarily necessary to provide the black layer 32B in the peripheral section 34, similar to the modification 1-2. Alternatively, the black layer 32B may be provided in respective regions between the transparent substrate 32A and the sealing layer 41 and defined inwardly of the sealing layer 41.

[Sixth Embodiment]

Figure 22:
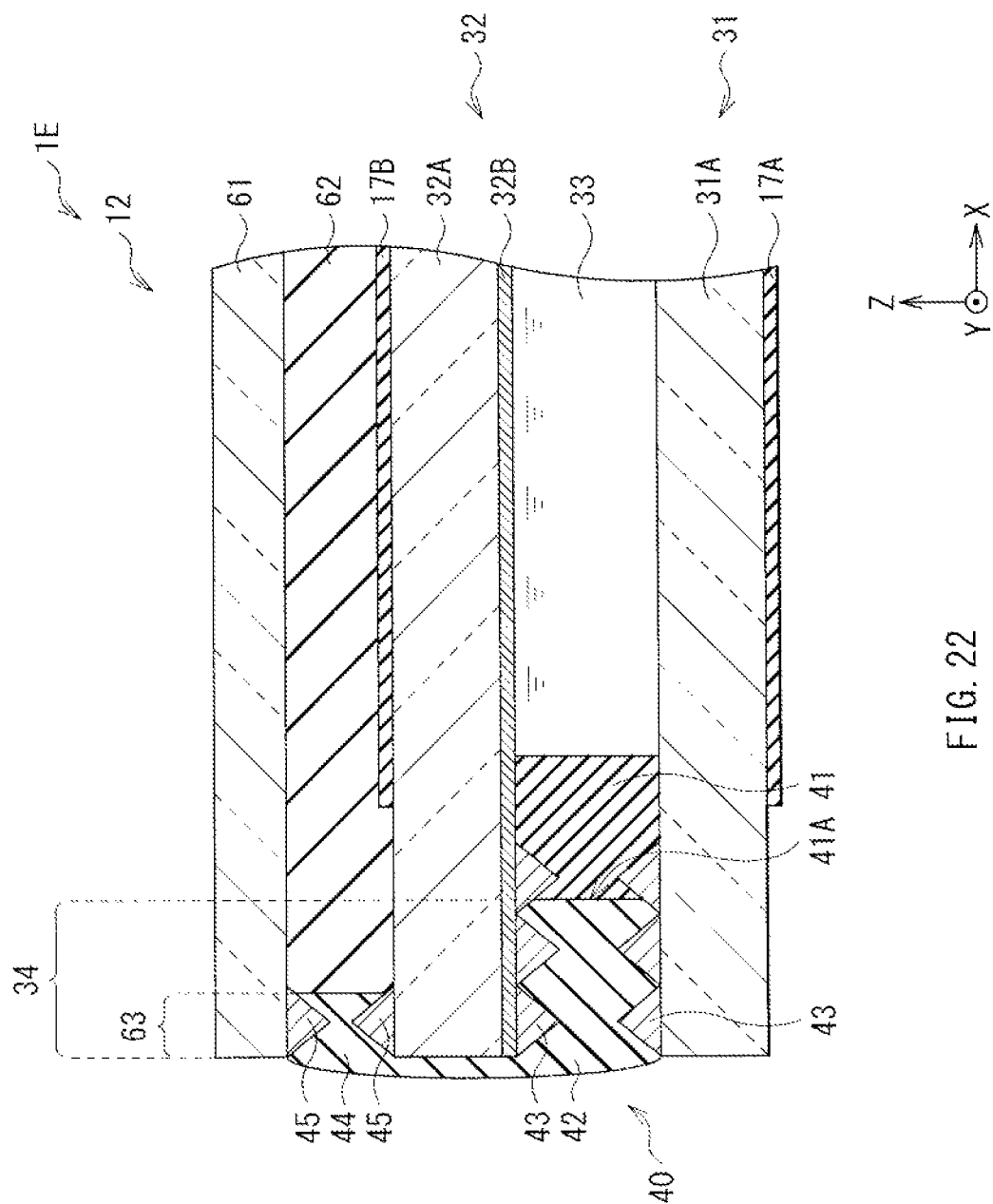
FIG. 22 is a rough cross-sectional view of a liquid crystal cell in a display device according to a sixth embodiment of the present disclosure.

FIG. 22 roughly illustrates a cross-sectional configuration of the liquid crystal cell 12 in a display device 1E according to a sixth embodiment of the present disclosure. The display device 1E has the same configuration, function, and effect as the above first embodiment, with the exception that an optical member 61 is bonded to the outer surface of the second base material 32 with a bonding layer 62 and that an upper moisture-proof material 44 is provided in contact with an outer side 62A of the bonding layer 62. It is therefore possible to manufacture the display device 1E through the same processing as that for the first embodiment.

The optical member 61 may be, for example, a glass pattern retarder used to display a 3D image, and includes a glass substrate and an optical function film such as a ½ wavelength plate bonded to the glass substrate. In addition, typical polarizing plates 17A and 17B are bonded to the outer surfaces, respectively, of the first base material 31 and the second base material 32, separately from the optical member 61.

The bonding layer 62 bonds the optical member 61 to the second base material 32, and may be made of, for example, a thermosetting or ultraviolet curable resin.

The moisture-proof structure 40 includes the upper moisture-proof material 44 and upper uneven structures 45. The upper moisture-proof material 44 is provided in contact with an outer side 62A of the bonding layer 62 and in a peripheral section 63 on the second base material 32 and the optical member 61 which is located outside the bonding layer 62. The upper uneven structures 45 are provided in respective parts of the optical member 61 and the second base material 32 which make contact with the upper moisture-proof material 44. The sixth embodiment configured above successfully suppresses moisture from entering the bonding layer 62 even when the optical member 61 is provided on the outer surface of the second base material 32.

Preferably the moisture-proof material 42 and the upper moisture-proof material 44 may be continuously integrated by being connected to each other through the side of the second base material 32. For that purpose, the moisture-proof material 42 and the upper moisture-proof material 44 may be applied at the same process. This configuration successfully provides higher strength than when the moisture-proof material 42 and the upper moisture-proof material 44 are provided separately from each other.

The modifications 1-1 and 1-2 are also applicable to the sixth embodiment. In addition, the sixth embodiment may be used in combination with one of the second to fifth embodiments.

[Seventh Embodiment]

Figure 23:
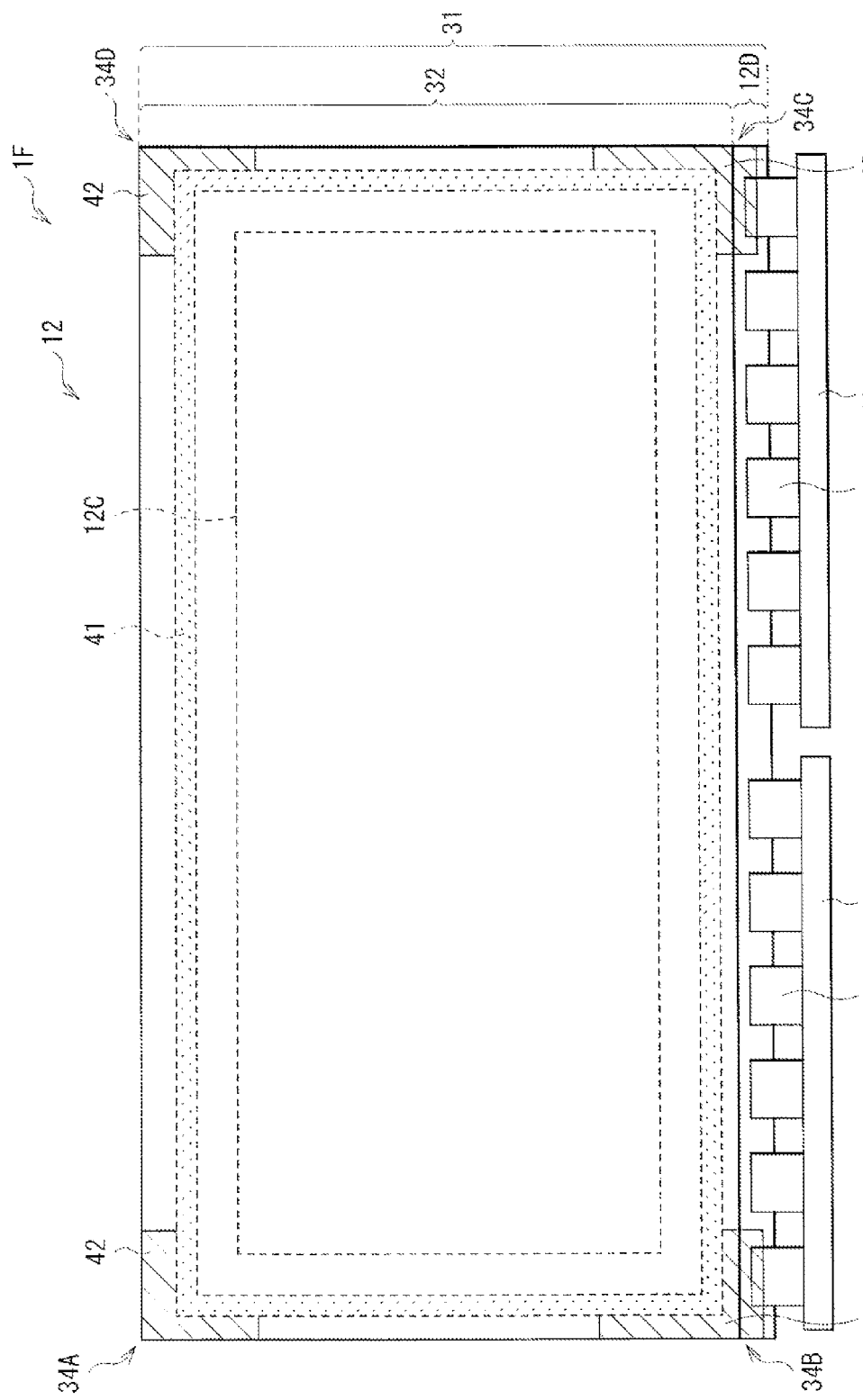
FIG. 23 is a plan view of a liquid crystal cell in a display device according to a seventh embodiment of the present disclosure.

FIG. 23 roughly illustrates a planar configuration of the liquid crystal cell 12 in a display device 1F according to a seventh embodiment of the present disclosure. In the seventh embodiment, the moisture-proof materials 42 may be provided only in corners 34A, 34B, 34C, and 34D of the peripheral section 34. With the exception of this configuration, the display device 1F has the same configuration, function, and effect as the above first embodiment.

The sealing layer 41 is formed in a rectangular frame shape so as to surround the display region 12C, as described in the first embodiment. Since the sealing layer 41 is formed by applying the resin at one time during its manufacturing process, the sealing layer 41 tends to be narrowed in the corners 34A to 34D. In addition, since the sealing strength of the sealing layer 41 tends to be deteriorated in the corners 34A to 34D, the sealing layer 41 is likely to be peeled there. In the seventh embodiment, the moisture-proof materials 42 are provided locally in the corners 34A to 34D, thereby enhancing the sealing performance in the corners 34A to 34D.

Figure 24:
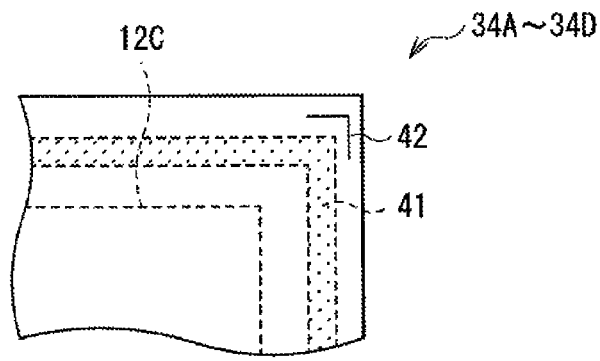
FIG. 24 is a plan view of an example of a moisture-proof material illustrated in FIG. 23.
Figure 25:
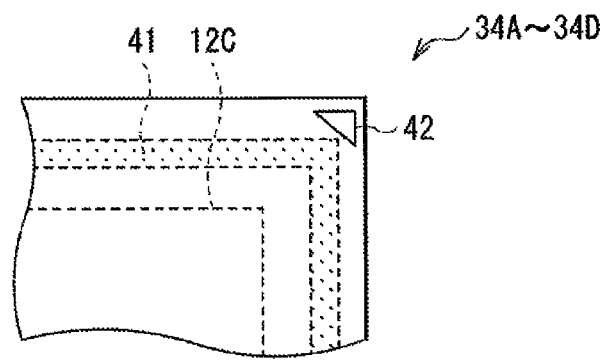
FIG. 25 is a plan view of another example of the moisture-proof material illustrated in FIG. 23.
Figure 26:
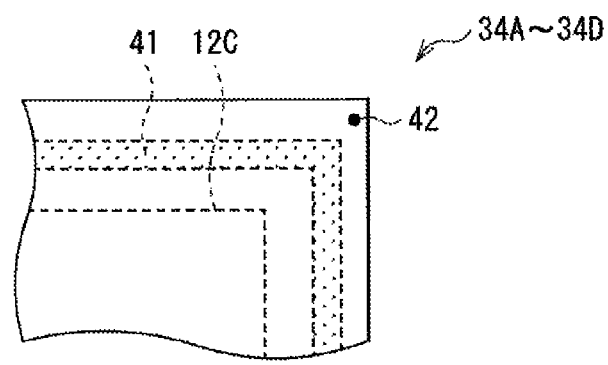
FIG. 26 is a plan view of further another example of the moisture-proof material illustrated in FIG. 23.

The moisture-proof material 42 may be provided in an alphabet L-like shape along each of the corners 34A to 34D, for example, as illustrated in FIG. 24. Alternatively, the moisture-proof material 42 may be provided in a triangular shape so as not to overlap the sealing layer 41 or the display region 12C, for example, as illustrated in FIG. 25. Alternatively, the moisture-proof material 42 may be provided in a dot shape in the vicinity of the apexes of each of the corners 34A to 34D, for example, as illustrated in FIG. 26.

Each uneven structure 43 may be provided either only in the corners 34A to 34D or throughout the peripheral section 34.

[Eighth Embodiment]

Figure 27:
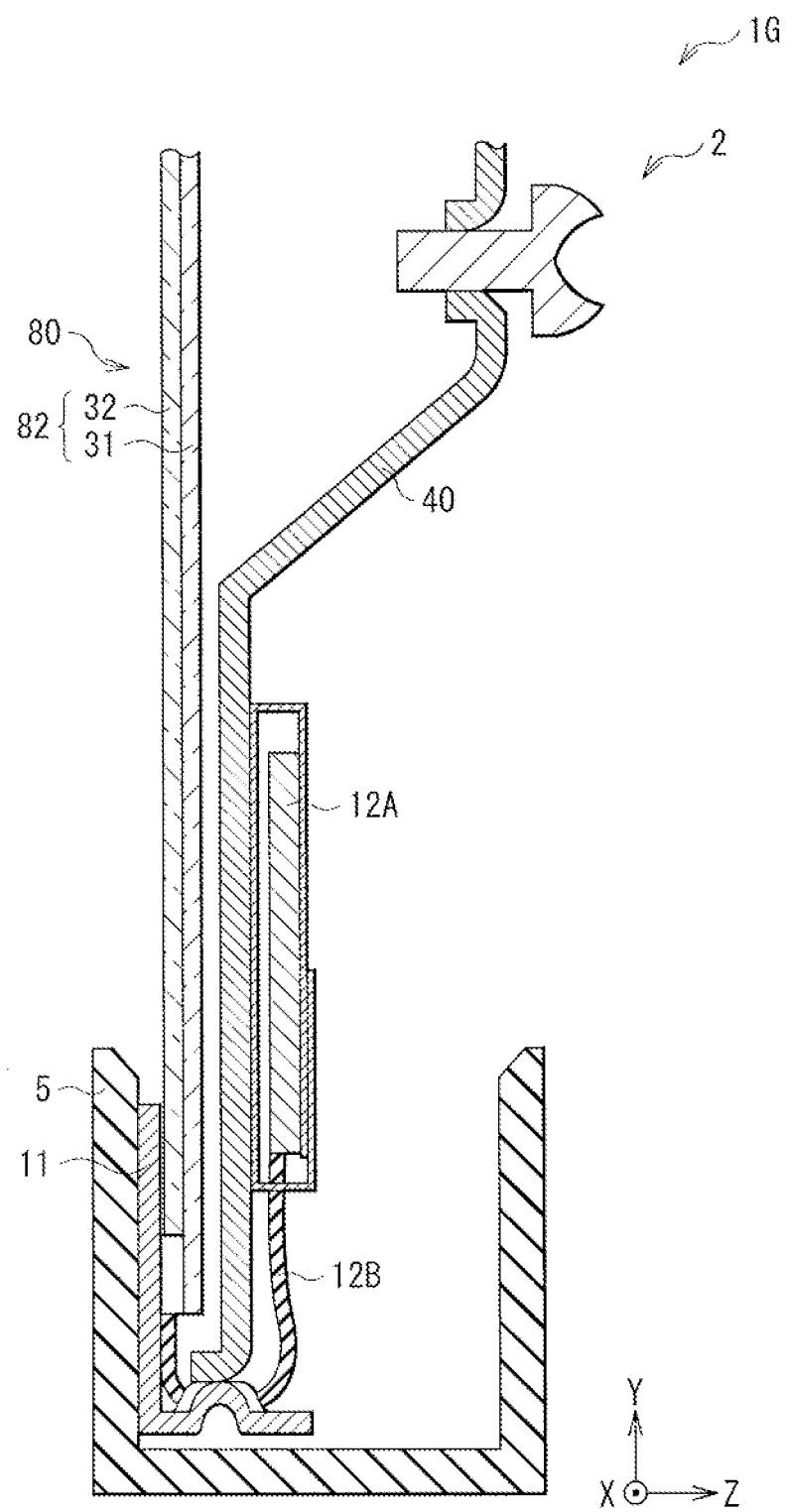
FIG. 27 is a cross-sectional view of an exemplary internal configuration of a center part of an organic EL panel in a display device according to an eighth embodiment of the present disclosure.

FIG. 27 illustrates an internal configuration of a center part of the main body 2 in a display device 1G according to an eighth embodiment of the present disclosure, a cross-section of the main body 2 being parallel to the Y direction. The display device 1G has the same configuration as the above display device 1 of the first embodiment, with the exception that the main body 2 has an organic EL panel 80 as a display body, instead of the liquid crystal panel 10. A description will be accordingly given by assigning the same reference numerals to corresponding constituents.

The organic EL panel 80 includes the front casing (top chassis) 11 and an organic EL cell 82 from the front to rear along the Z direction, in this order. The front casing 11 is the same as that of the first embodiment.

The organic EL cell 82 may have a configuration, for example, in which an organic EL element to be described later (not illustrated in FIG. 27; refer to FIG. 30) is provided on the first base material 31 made of a glass or the like, and the organic EL element sealed by the second base material 32 made of a glass or the like. The organic EL cell may be provided with, for example, source drivers (not illustrated) and source substrates 12A. The organic EL cell 82 is connected to the source substrates 12A by the pieces of COF (Chip on Film) 12B.

The organic EL cell 82 is only the primary constituent (excluding the frame-shaped components, the substrates, etc.) of the organic EL panel 80. The organic EL cell 82 is configured with a thin-plate shaped or frame-shaped flexible member made of a material such as a glass or resin. The organic EL panel 80 of the eighth embodiment accordingly exhibits a greater flexibility than the above liquid crystal panel 10 of the first embodiment. Thus, the eighth embodiment successfully enhances the effect of the first embodiment.

The front exterior member 4, the decorative member 5, and the rear exterior member 6 in the main body 2 may have the same configurations as those in the first embodiment. The stands 3 and the plate member 20 may have the same configurations as those in the first embodiment.

Figure 28:
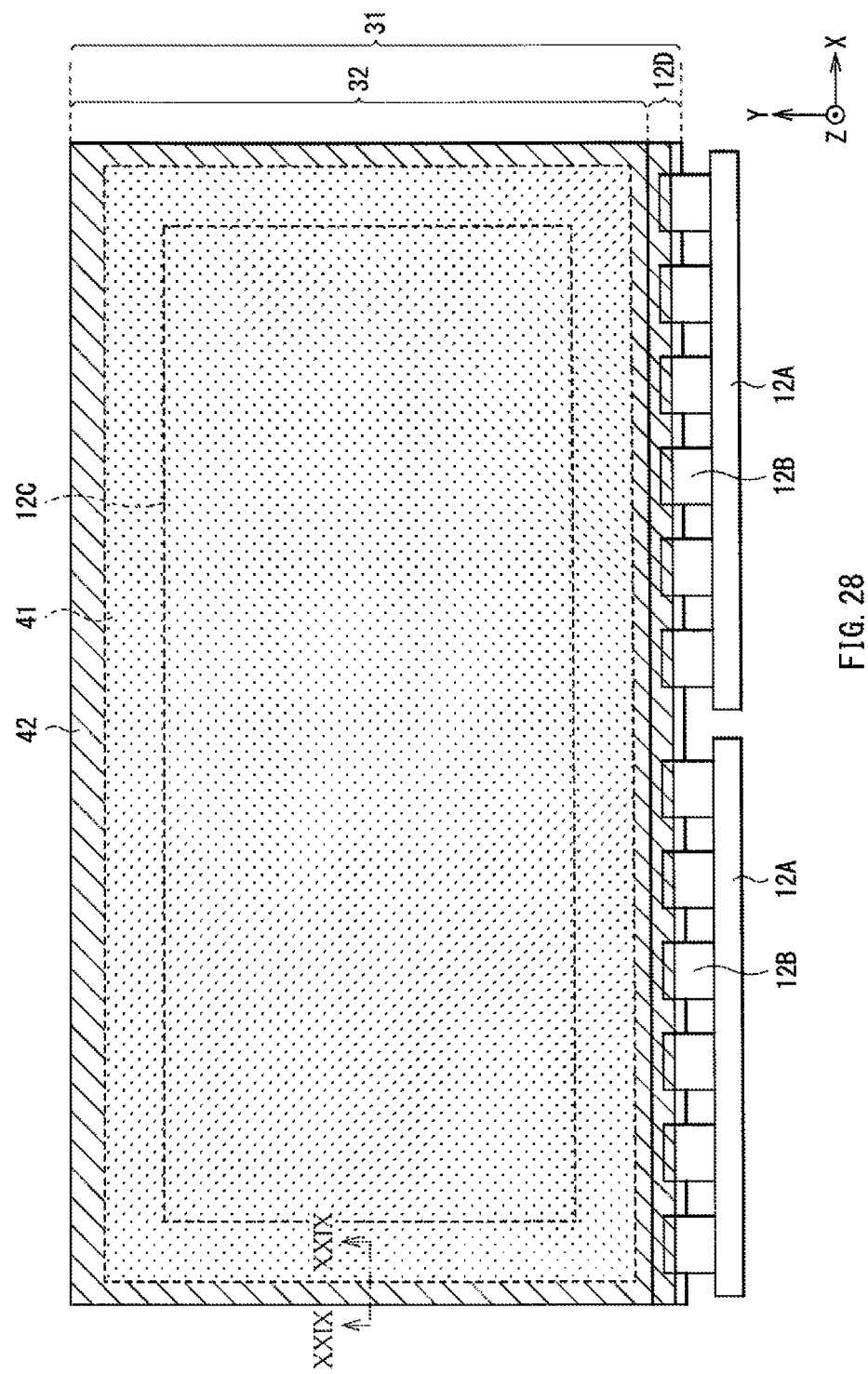
FIG. 28 is a plan view of an organic EL cell illustrated in FIG. 27.

FIG. 28 illustrates a planar configuration of the organic EL cell 82 illustrated in FIG. 27. The organic EL cell 82 is rectangular in a plane that is longer in the X direction, and the display region 12C is provided at its center. The organic EL cell 82 has a configuration in which the first base material 31 and the second base material 32 are arranged opposite each other. The organic EL element to be described later is provided between the first base material 31 and the second base material 32. The organic EL element is disposed in the display region 12C positioned at the center of the organic EL cell 82.

The organic EL cell 82 has the extended region 12D on one side (e.g. a lower side) thereof in which the first base material 31 protrudes from the second base material 32. The extended region 12D is provided with terminals 12E (not illustrated in FIG. 28; refer to FIG. 11) connected to the pieces of COF 12B. On each of the other three sides of the organic EL cell 82, the respective sides of the first base material 31 and the second base material 32 are aligned with each other.

Figure 29:
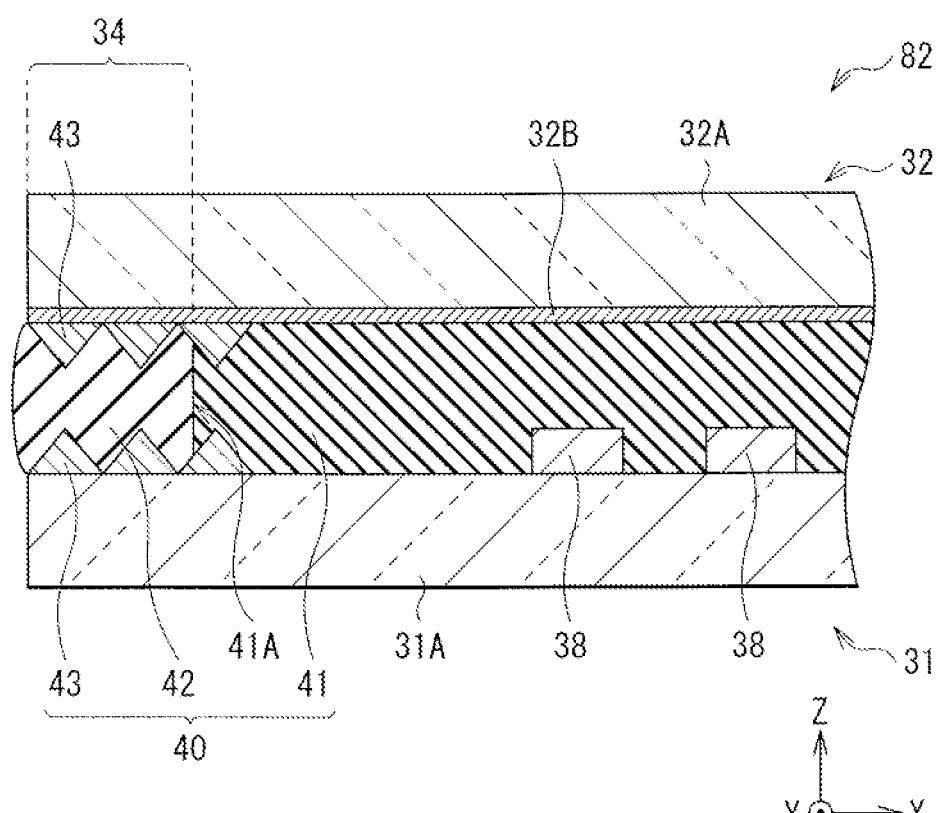
FIG. 29 is a rough cross-sectional view of the organic EL cell illustrated in FIG. 28 taken along a line XXIX-XXIX.

FIG. 29 illustrates a cross section of respective sides of the first base material 31 and the second base material 32 illustrated in FIG. 28 which are aligned with each other, the cross section being parallel to the X direction. The organic EL element 38 is provided between the first base material 31 and the second base material 32, as described above. The first base material 31 and the second base material 32 have the transparent substrates 31A and 32A, respectively. Each of the transparent substrates 31A and 32A may be configured with, for example, a glass substrate, a semiconductor substrate made of silicon or the like, or a flexible substrate made of a plastic or the like. Although patterns of a metal or resin layer, which configure the organic EL element 38, are provided on each of the transparent substrates 31A and 32A, FIG. 29 illustrates only the black layer 32B on the transparent substrate 32A as a black matrix and does not illustrate any other metal or resin patterns.

The organic EL cell 82 is provided with the moisture-proof structure 40 that sets the organic EL element as a moisture-proof target, similar to the first embodiment. The moisture-proof structure 40 includes the sealing layer 41 and the moisture-proof material 42, similar to the first embodiment. The sealing layer 41 covers the organic EL element 38 between the first base material 31 and the second base material 32. The moisture-proof material 42 is provided in contact with the outer side 41A of the sealing layer 41 and in the peripheral section 34 on the first base material 31 and the second base material 32 which is located outside the sealing layer 41. The uneven structures 43 are provided in the respective parts of the first base material 31 and the second base material 32 which make contact with the moisture-proof material 42. The display device 1G configured above successfully suppresses entry of moisture into the sealing layer 41, similar to the first embodiment.

The sealing layer 41 also functions as a bonding layer by which the respective entire surfaces of the first base material 31 and the second base material 32 are bonded to each other. The sealing layer 41 entirely coats the display region 12C, and is provided in an almost entire space between the first base material 31 and the second base material 32, as illustrated in FIG. 28. The moisture-proof material 42 and the uneven structures 43 have the same configurations as those of the first embodiment. In FIG. 28, an area in which the sealing layer 41 is provided is dotted, and an area in which the moisture-proof material 42 is provided is hatched by positively slanting lines.

Figure 30:
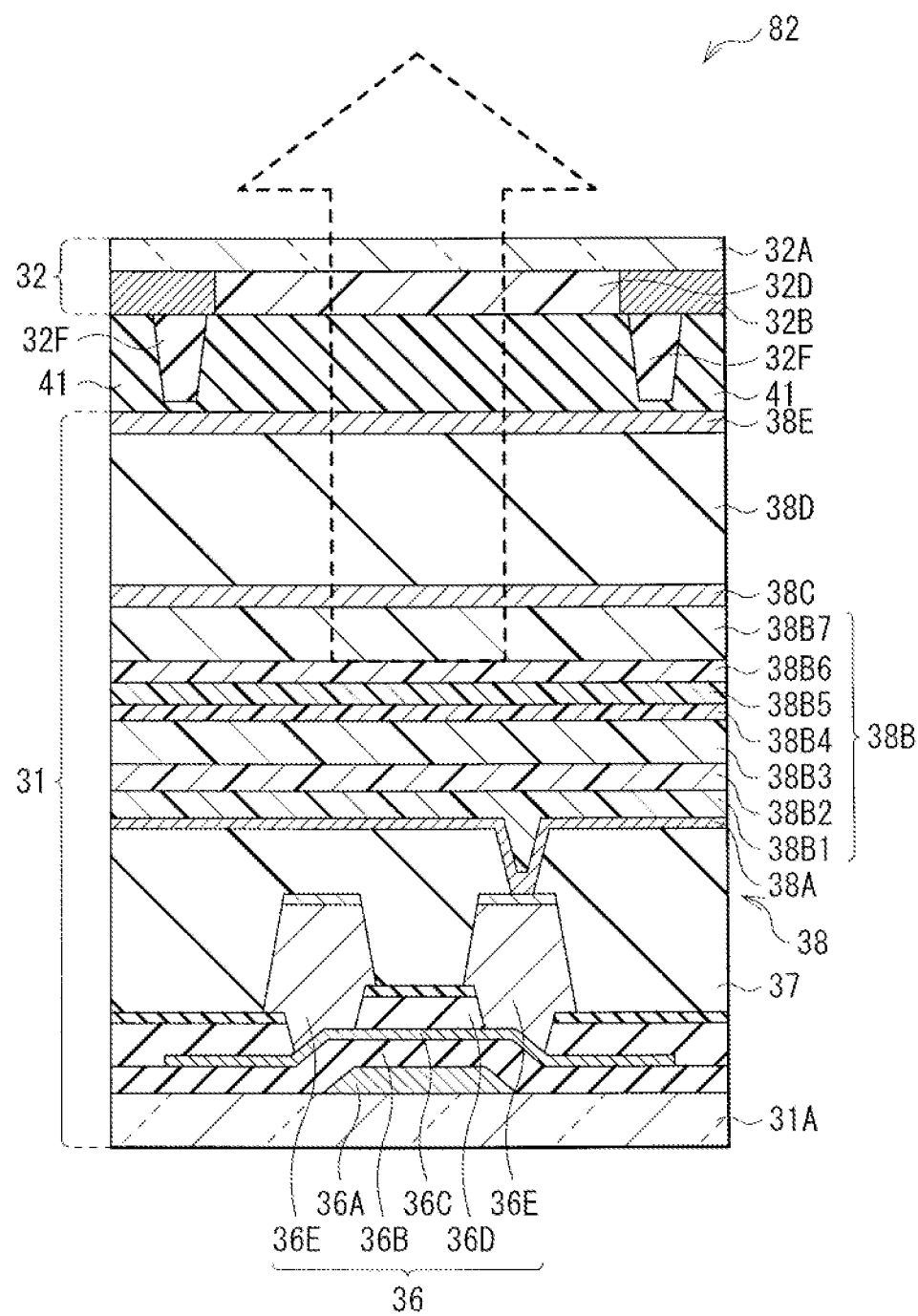
FIG. 30 is a cross-sectional view of an exemplary display region of the organic EL cell illustrated in FIG. 28.

FIG. 30 illustrates an example of the display region of the organic EL cell 82 illustrated in FIG. 28. The first base material 31 includes an oxide TFT 36, a planarization insulating film 37, and an organic EL element 38 on the transparent substrate 31A, in this order.

The oxide TFT 36 may include, for example, a gate electrode 36A, a gate insulating film 36B, an oxide semiconductor film 36C, an interlayer insulating film 36D, and a source-drain electrode 36E on the transparent substrate 31A, in this order. The gate electrode 36A may be configured with a pattern of a metal layer made of, for example, molybdenum (Mo) or an Al—Nd alloy. The gate insulating film 36B may be either a unilaminate film made of, for example, $SiO_2$, SiNx, SiON or AlOx, or a laminate film made of two or more of them. The oxide semiconductor film 36C may be made of an oxide semiconductor containing, for example, one or more of indium (In), gallium (Ga), zinc (Zn), silicon (Si), and tin (Sn). Examples of an amorphous one of this oxide semiconductor may include indium tin zinc oxide (ITZO) and indium gallium zinc oxide (IGZO, InGaZnO). Examples of a crystalline oxide semiconductor may include zinc oxide (ZnO), indium zinc oxide (IZO), indium gallium oxide (IGO), ITO, and indium oxide (InO). The interlayer insulating film 36D may be either a unilaminate film made of, for example, $SiO_2$, SiNx, SiON or AlOx, or a laminate film made of two or more of them. The source-drain electrode 36E may be made of, for example, a metal having a low resistance, such as Al or Cu.

The planarization insulating film 37 may be made of, for example, a polyimide or acrylic resin.

The organic EL element 38 includes, for example, a first electrode 38A, an organic layer 38B, a translucent reflective layer 38C, a high resistance layer 38D, and a second electrode 38E on the planarization insulating film 37, in this order. The first electrode 38A may be configured with a pattern of a metal layer made of, for example, Al or ITO. The organic layer 38B may be a white light emitting layer having a tandem structure which includes, for example, a yellow light emitting unit, a connecting layer 38B4, and a blue color light emitting unit stacked on the first electrode 38A, in this order. The yellow light emitting unit may include, for example, a hole transport layer 38B1, a yellow light emitting layer 38B2, and an electron transport layer 38B3 on the first electrode 38A, in this order. The blue color light emitting unit may include, for example, a hole transport layer 38B5, a blue light emitting layer 38B6, and an electron transport layer 38B7 on the connecting layer 38B4, in this order. The translucent reflective layer 38C may be made of, for example, an Mg—Ag alloy. The high resistance layer 38D may be made of, for example, $SiO_2$. The second electrode 38E may be configured with a pattern of a metal layer made of, for example, ITO.

The second base material 32 may include the above-described black layer 32B as the black matrix and the above-described color filter 32D on the transparent substrate 32A. Pillars 32F are provided on the color filter 32D. Each of the black layer 32B, the color filter 32D, and the pillars 32F may be a pattern of a resin layer.

The uneven structure 43 on the first base material 31, as illustrated in FIG. 29, may be configured with a pattern of a metal layer, for example, which configures the first electrode 38A of the organic EL element 38. The uneven structure 43 on the second base material 32, as illustrated in FIG. 29, may be configured with a pattern of a resin layer, for example, which configures the color filter 32D.

A planar configuration of each uneven structure 43 is the same as that of the first embodiment which has been described with reference to FIGS. 9 and 10.

It is possible to manufacture the above display device 1G through the same processing as that for the above embodiments, with the exception that the organic EL panel 80 is provided instead of the liquid crystal panel 10. In addition, a function of the display device 1G is the same as that of the above embodiments.

[Ninth Embodiment]

Figure 31:
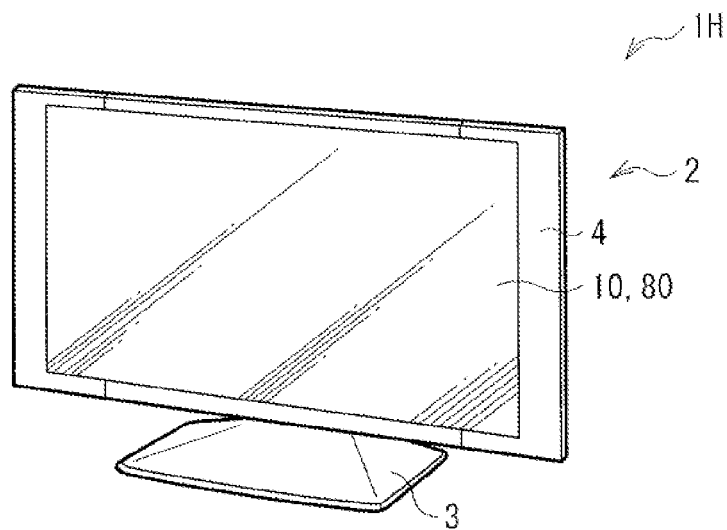
FIG. 31 is a perspective view illustrating an exemplary appearance of a display device according to a ninth embodiment of the present disclosure.

FIG. 31 illustrates an exemplary appearance of a display device 1H according to a ninth embodiment of the present disclosure. The display device 1H provides the same configuration, function, and effect as the above first embodiment, with the exception that the liquid crystal panel (or the organic EL panel 80) is flat (or not curved). It is therefore possible to manufacture the display device 1H through the same processing as that for the first embodiment.

[Modification 9-1]

Figure 32:
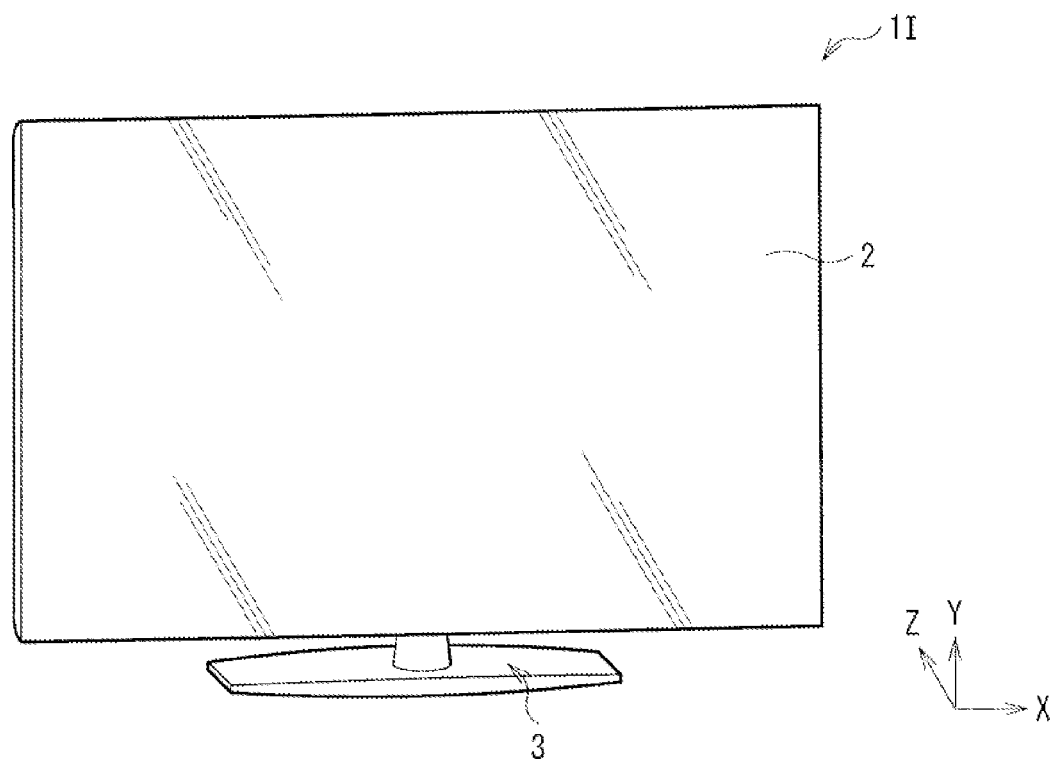
FIG. 32 is a perspective view illustrating an exemplary appearance of a display device according to a modification 9-1.

The first to ninth embodiments have been described regarding the case where the front casing 11 and the front exterior members 4 are attached to the front outer region of the liquid crystal panel 10 (or the organic EL panel 80). The front casing 11 and the front exterior members 4, however, may also be removed to provide the better design, as illustrated in FIG. 32. In the modification 9-1, the liquid crystal panel (or the organic EL panel 80) may be used as a viewing screen surface of a display device 1I without using any additional components. Alternatively, a transparent plate made of, for example, a glass or resin may be bonded to the front surface of the liquid crystal panel 10 (or the organic EL panel 80). In the modification 9-1, as described in the first embodiment, the black layer 32B may be preferably provided up to the end of the transparent substrate 32A, because none of the front casing 11 and the front exterior members 4 is provided.

Up to this point, the embodiments and the like of the present disclosure have been described. The present disclosure is not limited to the above-described embodiments and the like, and various modifications thereof are possible. For example, there is no specific limitation on the material, thickness, and the like of each layer that has been described in the embodiments and the like; other material, thickness, and the like may be employed.

For example, although the configurations of the display devices 1 to 1I (television devices) have been described in the above embodiments and the like by giving the specific examples, one or more of the constituents may be omitted, or one or more additional constituents may be further provided.

The embodiments and the like of the present disclosure are widely applicable to electronic apparatuses in various fields which receive image signals from the exterior or generate them therein and display pictures or images based on the image signals. Examples of such electronic apparatuses may include smartphones and tablets, in particular, with a curved body, and some other display devices, in addition to the television devices described in the embodiments and the like.

Furthermore, the technology encompasses any possible combination of some or all of the various embodiments described herein and incorporated herein.

It is possible to achieve at least the following configurations from the above-described example embodiments of the disclosure.

(1) A moisture-proof structure including:

a sealing layer surrounding or covering a moisture-proof target between a first base material and a second base material;

a moisture-proof material provided in contact with an outer side of the sealing layer and in a peripheral section of the first base material and the second base material, the peripheral section being located outside the sealing layer; and an uneven structure provided in a part of the first base material that makes contact with the moisture-proof material and in a part of the second base material that makes contact with the moisture-proof material.

(2) The moisture-proof structure according to (1), wherein the moisture-proof material is provided throughout the peripheral section.

(3) The moisture-proof structure according to (1) or (2), wherein the uneven structure extends from the part of the first base material that makes contact with the moisture-proof material and from the part of the second base material that makes contact with the moisture-proof material, to a part of the first base material that makes contact with the sealing layer and to a part of the second base material that makes contact with the sealing layer.

(4) The moisture-proof structure according to (1) or (3), wherein the moisture-proof material is provided only in a corner of the peripheral section.

(5) The moisture-proof structure according to any one of (1) to (4), further including a presser member provided on an outer surface of the peripheral section.

(6) The moisture-proof structure according to any one of (1) to (5), wherein the first base material and the second base material are curved in a one-dimensional direction.

(7) The moisture-proof structure according to any one of (1) to (6), wherein each of the first base material and the second base material has one of a metal layer and a resin layer on a transparent substrate, and the uneven structure is configured of a pattern of one of the metal layer and the resin layer.

(8) The moisture-proof structure according to any one of (1) to (6), wherein each of the first base material and the second base material has a transparent substrate, and the uneven structure is configured by a groove provided in one or both of the transparent substrates.

(9) The moisture-proof structure according to any one of (1) to (6), wherein each of the first base material and the second base material has a transparent substrate, and the uneven structure is configured by surface roughness of one or both of the transparent substrates.

(10) A display device provided with a display element and a moisture-proof structure, the display element being provided between a first base material and a second base material, and the moisture-proof structure setting the display element as a moisture-proof target, the moisture-proof structure including:

a sealing layer surrounding or covering the display element between the first base material and the second base material;

a moisture-proof material provided in contact with an outer side of the sealing layer and in a peripheral section of the first base material and the second base material, the peripheral section being located outside the sealing layer; and an uneven structure provided in a part of the first base material that makes contact with the moisture-proof material and in a part of the second base material that makes contact with the moisture-proof material.

(11) The display device according to (10), wherein the moisture-proof material is provided throughout the peripheral section.

(12) The display device according to (10) or (11), wherein the uneven structure extends from the part of the first base material that makes contact with the moisture-proof material and from the part of the second base material that makes contact with the moisture-proof material, to a part of the first base material that makes contact with the sealing layer and to a part of the second base material that makes contact with the sealing layer.

(13) The display device according to (10) or (12), wherein the moisture-proof material is provided only in a corner of the peripheral section.

(14) The display device according to any one of (10) to (13), further including a presser member provided on an outer surface of the peripheral section.

(15) The display device according to any one of (10) to (14), wherein the first base material and the second base material are curved in a one-dimensional direction.

(16) The display device according to any one of (10) to (15), wherein the second base material has a black layer on an inner surface of a transparent substrate.

(17) The display device according to (16), wherein the black layer is provided between the transparent substrate and the sealing layer.

(18) The display device according to any one of (10) to (17), further including:
an optical member disposed on an outer surface of the second base material; and
a bonding layer bonding the optical member to the second base material,
wherein the moisture-proof structure further includes an upper moisture-proof material and an upper uneven structure, the upper moisture-proof material being provided in contact with an outer side of the bonding layer and in a peripheral section of the second base material and the optical member, the peripheral section being located outside the bonding layer, and the upper uneven structure being provided a part of the optical member that makes contact with the upper moisture-proof material and a part of the second base material that makes contact with the upper moisture-proof material.

(19) The display device according to (18), wherein the moisture-proof material and the upper moisture-proof material are integrated.

(20) The display device according to any one of (10) to (19), wherein
the first base material has an extended region protruding from the second base material,
the extended region is provided with a terminal and a flexible wiring board connected to the terminal, and
the moisture-proof material extends from the outer side of the sealing layer to an end of the flexible wiring board.

It should be understood by those skilled in the art that various modifications, combinations, sub-combinations and alterations may occur depending on design requirements and other factors insofar as they are within the scope of the appended claims or the equivalents thereof.

What is claimed is:

1. A moisture-proof structure comprising:
a sealing layer surrounding or covering a moisture-proof target between a first base material and a second base material;
a moisture-proof material provided in contact with an outer side of the sealing layer and in a peripheral section of the first base material and the second base material, the peripheral section being located outside the sealing layer; and
an uneven structure provided in a part of the first base material that makes contact with the moisture-proof material and in a part of the second base material that makes contact with the moisture-proof material,
in which the sealing layer is formed from a material different from the moisture-proof material, and
in which (i) the uneven structure extends from the part of the first base material that makes contact with the moisture-proof material to a part of the first base material that makes contact with the material of the sealing layer which is different from the moisture-proof material, and (ii) the uneven structure extends from the part of the second base material that makes contact with the moisture-proof material to a part of the second base material that makes contact with the material of the sealing layer which is different from the moisture-proof material.

2. The moisture-proof structure according to claim 1, wherein the moisture-proof material is provided throughout the peripheral section.

3. The moisture-proof structure according to claim 1, wherein the moisture-proof material is provided only in a corner of the peripheral section.

4. The moisture-proof structure according to claim 1, further comprising a presser member provided on an outer surface of the peripheral section.

5. The moisture-proof structure according to claim 1, wherein the first base material and the second base material are curved in a one-dimensional direction.

6. The moisture-proof structure according to claim 1, wherein
each of the first base material and the second base material has one of a metal layer or a resin layer on a transparent substrate.

7. The moisture-proof structure according to claim 1, wherein
each of the first base material and the second base material has a transparent substrate.

8. A display device provided with a display element and a moisture-proof structure, the display element being provided between a first base material and a second base material, and the moisture-proof structure setting the display element as a moisture-proof target, the moisture-proof structure comprising:
a sealing layer surrounding or covering the display element between the first base material and the second base material;
a moisture-proof material provided in contact with an outer side of the sealing layer and in a peripheral section of the first base material and the second base material, the peripheral section being located outside the sealing layer; and
an uneven structure provided in a part of the first base material that makes contact with the moisture-proof material and in a part of the second base material that makes contact with the moisture-proof material,
in which the sealing layer is formed from a material different from the moisture-proof material, and
in which (i) the uneven structure extends from the part of the first base material that makes contact with the moisture-proof material to a part of the first base material that makes contact with the material of the sealing layer which is different from the moisture-proof material, and (ii) the uneven structure extends from the part of the second base material that makes contact with the moisture-proof material to a part of the second base material that makes contact with the material of the sealing layer which is different from the moisture-proof material.

9. The display device according to claim 8, wherein the moisture-proof material is provided throughout the peripheral section.

10. The display device according to claim 8, wherein the moisture-proof material is provided only in a corner of the peripheral section.

11. The display device according to claim 8, further comprising a presser member provided on an outer surface of the peripheral section.

12. The display device according to claim 8, wherein the first base material and the second base material are curved in a one-dimensional direction.

13. The display device according to claim 8, wherein the second base material has a black layer on an inner surface of a transparent substrate.

14. The display device according to claim 13, wherein the black layer is provided between the transparent substrate and the sealing layer.

15. The display device according to claim 8, wherein
the first base material has an extended region protruding from the second base material,
the extended region is provided with a terminal and a flexible wiring board connected to the terminal, and
the moisture-proof material extends from the outer side of the sealing layer to an end of the flexible wiring board.

16. A display device provided with a display element and a moisture-proof structure, the display element being provided between a first base material and a second base material, and the moisture-proof structure setting the display element as a moisture-proof target, the moisture-proof structure comprising:
a sealing layer surrounding or covering the display element between the first base material and the second base material;
a moisture-proof material provided in contact with an outer side of the sealing layer and in a peripheral section of the first base material and the second base material, the peripheral section being located outside the sealing layer; and
an uneven structure provided in a part of the first base material that makes contact with the moisture-proof material and in a part of the second base material that makes contact with the moisture-proof material,
the display device further having an optical member disposed on an outer surface of the second base material, and a bonding layer bonding the optical member to the second base material,
wherein the moisture-proof structure further includes an upper moisture-proof material and an upper uneven structure, the upper moisture-proof material being provided in contact with an outer side of the bonding layer and in a peripheral section of the second base material and the optical member, the peripheral section of the second base material and the optical member being located outside the bonding layer, and the upper uneven structure being provided in a part of the optical member that makes contact with the upper moisture-proof material and in a part of the second base material that makes contact with the upper moisture-proof material.

17. The display device according to claim 16, wherein the moisture-proof material and the upper moisture-proof material are integrated.

* * * * *